US012726786B2

(12) United States Patent
Kucuk et al.

(10) Patent No.: US 12,726,786 B2

(45) Date of Patent: Sep. 1, 2026

(54) APPARATUS, SYSTEM AND/OR METHOD FOR DEVICE LOCALIZATION AND OPTIMIZATION UTILIZING A PREDETERMINED AUDIBLE SIGNAL

(71) Applicant: Harman International Industries, Incorporated, Stamford, CT (US)

(72) Inventors: Abdullah Kucuk, Novi, MI (US); Anshuman Ganguly, Commerce, MI (US); Kadagattur Gopinatha Srinidhi, Stamford, CT (US)

(73) Assignee: Harman International Industries, Incorporated, Stamford, CT (US)

(*) Notice: Subject to any disclaimer, the term of this patent is extended or adjusted under 35 U.S.C. 154(b) by 196 days.

(21) Appl. No.: 18/680,604

(22) Filed: May 31, 2024

(65) Prior Publication Data

US 2025/0374002 A1 Dec. 4, 2025

(51) Int. Cl.

*H04B 3/20* (2006.01)
*H04R 27/00* (2006.01)

(Continued)

(52) U.S. Cl.

CPC ............ *H04S 7/305* (2013.01); *H04R 27/00* (2013.01); *H04R 2227/007* (2013.01)

(58) Field of Classification Search

CPC .... H04S 7/305; H04R 27/00; H04R 2227/007

(Continued)

(56) References Cited

U.S. PATENT DOCUMENTS

2013/0064379 A1* 3/2013 Pardo ........................ H04S 7/40 381/56
2015/0219755 A1* 8/2015 Borggaard ................ G01S 5/30 367/118

(Continued)

OTHER PUBLICATIONS

Farina, A., "Advancements in Impulse Response Measurements by Sine Sweeps", Presented at the Audio Engineering Society 122nd Convention, Vienna, Austria, 2007, 52 pgs.

(Continued)

*Primary Examiner* — Ammar T Hamid

(74) *Attorney, Agent, or Firm* — BROOKS KUSHMAN P.C.

(57) ABSTRACT

In at least one embodiment, an audio system including a first loudspeaker and a second loudspeaker and at least one controller is provided. The first loudspeaker transmits a first audio signal including a first signature tone into a listening environment. The second loudspeaker transmits a second audio signal including a second signature tone into the listening environment and receive the first audio signal including and the first signature tone. The second loudspeaker receives the second audio signal including the second signature tone after transmitting the second signature tone into the listening environment and determines an estimated distance between the first loudspeaker and the second loudspeaker based at least on the first signature tone and the second signature tone. The second loudspeaker performs a time frequency masking operation to extract a least one of the first signature tone and the second signature tone from the noisy and reverberant mixture.

20 Claims, 11 Drawing Sheets

(51) Int. Cl.
*H04S 7/00* (2006.01)
*H03G 3/00* (2006.01)

(58) Field of Classification Search
USPC ........................................................ 381/66, 61
See application file for complete search history.

(56) References Cited

U.S. PATENT DOCUMENTS

| | | | | |
|---|---|---|---|---|
| 2024/0381046 | A1* | 11/2024 | Thomas .................. | H04S 7/301 |
| 2024/0406646 | A1 | 12/2024 | Kucuk et al. | |
| 2024/0406655 | A1 | 12/2024 | Kucuk et al. | |
| 2024/0406668 | A1 | 12/2024 | Kucuk et al. | |

OTHER PUBLICATIONS

Peng, C. et al., "BeepBeep: A High Accuracy Acoustic Ranging System using COTS Mobile Devices", Nov. 2007, 14 pgs.
Tashev, I. J., "Sound Capture and Processing: Practical Approaches, Section 6.4. Practical Approaches and Tips", 2009, 6 pgs., John Wiley & Sons.
Liang, S. et al., "The optimal ratio time-frequency mask for speech separation in terms of the signal-to-noise ratio" The Journal of the Acoustical Society of America, Nov. 2013, 7 pgs., vol. 134, No. 5.
Xia, S. et al., "Using Optimal Ratio Mask as Training Target for Supervised Speech Separation", In 2017 Asia-Pacific Signal and Information Processing Association Annual Summit and Conference (APSIPA ASC), IEEE, 2017, 4 pgs.
Extended European Search Report of European patent application No. 25179095.2 dated Oct. 23, 2025, 10 pages.
Peng et al., "BeepBeep: A High Accuracy Acoustic Ranging System using COTS Mobile Devices", Sensys '07 Proceedings of the 5th ACM Conference on Embedded Networked Sensor Systems : Sydney, Australia, Nov. 6-9, 2007, ACM, New York, NY, USA, Nov. 6, 2007 (Nov. 6, 2007), pp. 1-14, XP058166287, DOI: 10.1145/1322263.1322265, ISBN: 978-1-59593-763-6.
Kovalyov et al., : "Joint Calibration and Synchronization of Two Arrays of Microphones and Loudspeakers Using Particle Swarm Optimization", IEEE Open Journal of Signal Processing, IEEE, vol. 2, Oct. 11, 2021 (Oct. 11, 2021), pp. 535-544, XP011885550, DOI: 10.1109/OJSP.2021.3118574, [retrieved on Oct. 27, 2021].
Cai et al., "Asynchronous Acoustic Localization and Tracking for Mobile Targets", IEEE Internet of Things Journal, IEEE, USA, vol. 7, No. 2, Oct. 2, 2019 (Oct. 2, 2019), pp. 830-845, XP011771995, DOI: 10.1109/JIOT.2019.2945054 [retrieved on Feb. 11, 2020].
Jia et al., "Smartphone-Based Social Distance Detection Technology with Near-Ultrasonic Signal", Sensors, vol. 22, No. 19, Jan. 1, 2022 (Jan. 1, 2022), pp. 1-30, XP093220536, CH ISSN: 1424-8220, DOI: 10.3390/s22197345.

* cited by examiner

322

Step 1 • Outlier Detection for Distance and Orientation Estimation

500

Dist_Est* =

| ⬚ | S1 | S2 | S3 | S4 |
|---|---|---|---|---|
| S1 | -360 | 200 | 283 | 200 |
| S2 | 200 | -360 | 200 | 283 |
| S3 | 283 | 200 | -360 | 200 |
| S4 | 200 | 283 | 200 | -360 |

502

DOA_Est** =

| ⬚ | S1 | S2 | S3 | S4 |
|---|---|---|---|---|
| S1 | -360 | 0 | 45 | 90 |
| S2 | 180 | -360 | 90 | 135 |
| S3 | 45 | 90 | -360 | 0 |
| S4 | 90 | 135 | 180 | -360 |

⬚* :Distance Estimation in cm
⬚** :DOA Estimation in Degree

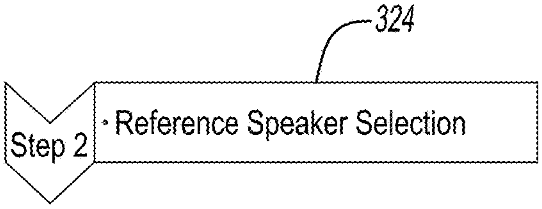

$$\text{dist\_outlier} = \begin{bmatrix} \square & S1 & S2 & S3 & S4 \\ S1 & -360 & 0 & 0 & 0 \\ S2 & 0 & -360 & 0 & 0 \\ S3 & 0 & 0 & -360 & 0 \\ S4 & 0 & 0 & 0 & -360 \end{bmatrix}$$

$$\text{doa\_outlier} = \begin{bmatrix} \square & S1 & S2 & S3 & S4 \\ S1 & -360 & 0 & 0 & 0 \\ S2 & 0 & -360 & 0 & 0 \\ S3 & 0 & 0 & -360 & 0 \\ S4 & 0 & 0 & 0 & -360 \end{bmatrix}$$

Fig-14

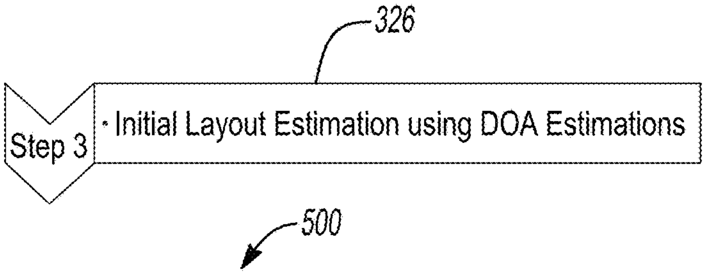

500

$$\text{Dist\_Est}^{*} = \begin{bmatrix} \square & S1 & S2 & S3 & S4 \\ S1 & -360 & 200 & 283 & 200 \\ S2 & 200 & -360 & 200 & 283 \\ S3 & 283 & 200 & -360 & 200 \\ S4 & 200 & 283 & 200 & -360 \end{bmatrix}$$

502

$$\text{DOA\_Est}^{**} = \begin{bmatrix} \square & S1 & S2 & S3 & S4 \\ S1 & -360 & 0 & 45 & 90 \\ S2 & 180 & -360 & 90 & 135 \\ S3 & 45 & 90 & -360 & 0 \\ S4 & 90 & 135 & 180 & -360 \end{bmatrix}$$

Fig-15

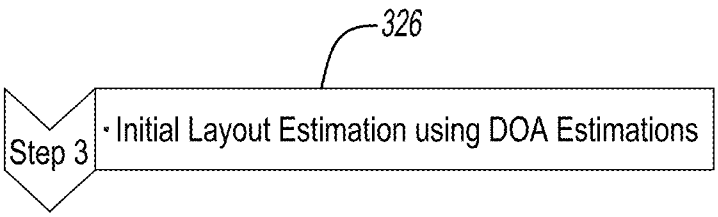

$$DOA\_S1 = \begin{bmatrix} \square & S1 & S2 & S3 & S4 \\ S1 & -360 & 0 & 45 & 90 \end{bmatrix} \qquad dist\_S1 = \begin{bmatrix} \square & S1 & S2 & S3 & S4 \\ S1 & 0 & 200 & 283 & 200 \end{bmatrix}$$

Coordinate Calculation Using Angle and Distance $$(x, y) = (x_{s1} + distance_{s1sj} * \cos(DOA_{s1sj}), y_{s1} - distance_{s1sj} * \sin(DOA_{s1sj}))$$

$$(x_2^1, y_2^1) = (200 * \cos(0), -200 * \sin(0)) = (200,0)$$

$$(x_3^1, y_3^1) = (283 * \cos(45), -283 * \sin(45)) = (200,-200)$$

$$(x_4^1, y_4^1) = (200 * \cos(90), -200 * \sin(90)) = (0,-200)$$

Fig-16

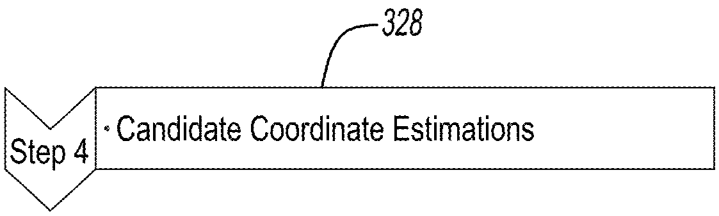

$$DOA\_S2 = \begin{bmatrix} \square & S1 & S2 & S3 & S4 \\ S1 & 180 & -360 & 90 & 35 \end{bmatrix} \qquad dist\_S2 = \begin{bmatrix} \square & S1 & S2 & S3 & S4 \\ S1 & 200 & 0 & 195 & 275 \end{bmatrix}$$

Coordinate Calculation Using Angle and Distance $$(x, y) = (x_{s2} + distance_{s2sj} * \cos(DOA_{s2sj}), y_{s2} - distance_{s2sj} * \sin(DOA_{s2sj}))$$

$(x_1^2, y_1^2)$ = No estimation for primary device and $(x_{s2}, y_{s2}) = (200,0)$ $$(x_3^2, y_3^2) = (200 + 195 * \cos(90), 0 - 195 * \sin(90) = (200, -195)$$

$$(x_4^2, y_4^2) = (275 * \cos(135), -275 * \sin(135)) = (5.54, -194.45)$$

Fig-17

330

Step 5 • Best Coordinates Selection

500

$$\text{Dist\_Est}^* = \begin{bmatrix} \square & S1 & S2 & S3 & S4 \\ S1 & -360 & 200 & 283 & 200 \\ S2 & 200 & -360 & 200 & 283 \\ S3 & 283 & 200 & -360 & 200 \\ S4 & 200 & 283 & 200 & -360 \end{bmatrix}$$

502

$$\text{DOA\_Est}^{**} = \begin{bmatrix} \square & S1 & S2 & S3 & S4 \\ S1 & -360 & 0 & 45 & 90 \\ S2 & 180 & -360 & 90 & 135 \\ S3 & 45 & 90 & -360 & 0 \\ S4 & 90 & 135 & 180 & -360 \end{bmatrix}$$

$$\text{Error}_{ic} = \sum |dist_{ij} - \hat{d}ist_{ij}| + |DOA_{ij} - \hat{D}OA\_ij|,\ i \neq j$$

where i and j represent the speaker number, C is the index for the candidates, $\hat{d}$ denotes the distance estimation for particular candidate points.

The method selects the candidate points which minimize the error in the final step.

Fig-18

APPARATUS, SYSTEM AND/OR METHOD FOR DEVICE LOCALIZATION AND OPTIMIZATION UTILIZING A PREDETERMINED AUDIBLE SIGNAL

TECHNICAL FIELD

Aspects disclosed herein generally relate to an apparatus, system and/or method for device localization and optimization utilizing a predetermined audible signal that may be used, for example, in loudspeaker audio auto calibration/configuration. These aspects and others will be discussed in more detail herein.

BACKGROUND

Various loudspeaker manufacturers or providers may bring together various loudspeaker categories to form one ecosystem. In this regard, various loudspeakers communicate or work with one another and/or with a mobile device. Therefore, such loudspeakers can achieve higher audio quality using immersive sound. Information related to the locations of the loudspeakers may be needed for immersive sound generation. Hence, auto-calibration may be needed before the loudspeakers can generate immersive sound.

SUMMARY

In at least one embodiment, an audio system including a first loudspeaker and a second loudspeaker and at least one controller is provided. The first loudspeaker transmits a first audio signal including and a first signature tone into a listening environment. The second loudspeaker transmits a second audio signal including a second signature tone into the listening environment and receive the first audio signal including and the first signature tone. The second loudspeaker receives the second audio signal including the second signature tone after transmitting the second signature tone into the listening environment and determines an estimated distance between the first loudspeaker and the second loudspeaker based at least on the first signature tone and the second signature tone. The second loudspeaker performs a time frequency masking operation to extract a least one of the first signature tone from the first audio signal and the second signature tone from the second audio signal prior to determining the estimated distance between the first loudspeaker and the second loudspeaker.

In at least another embodiment, an audio system including a first loudspeaker is provided. The first loudspeaker includes memory and at least one controller. The first loudspeaker transmitting a first audio signal including a first signature tone into a listening environment and receiving a second audio signal including a first signature tone from a second loudspeaker. The first loudspeaker receiving the first audio signal including the first signature tone after transmitting the first audio signal into the listening environment and determining an estimated distance between the first loudspeaker and the second loudspeaker based at least on the first signature tone and the second signature tone. The first loudspeaker performing a time frequency masking operation to extract at least one of the first signature tone from the first audio signal and the second signature tone from the second audio signal prior to determining the estimated distance between the first loudspeaker and the second loudspeaker.

In at least another embodiment, a computer-program product embodied in a non-transitory computer readable medium that is stored in memory and that is programmed and executable by at least one controller in an audio system is provided. The computer-program product includes instructions to receive a first audio signal including a first signature tone from a first loudspeaker and to receive a second audio signal including a second signature tone from a second loudspeaker. The computer-program product includes instructions to determine an estimated distance between the first loudspeaker and the second loudspeaker based at least on the first signature tone and the second signature tone and to perform a time frequency masking operation to extract at least one of the first signature tone from the first audio signal and the second signature tone from the second audio signal prior to determining the estimated distance between the first loudspeaker and the second loudspeaker.

An audio system includes a first loudspeaker and a second loudspeaker. The second loudspeaker includes comprising a plurality of microphones for receiving the audio signal and at least one controller. The at least one controller is programmed to receive the audio signal from the plurality of microphones and to determine a direction of arrival of the received audio signal from the first loudspeaker based at least on a signature tone. The at least one controller is further programmed to perform an impulse response (IR) measurement operation on the signature tone to determine a difference in peaks for the audio signal received at a first microphone and for the audio signal received at a second microphone to provide a time delay between the receipt of the audio signal at the first microphone and at the second microphone prior to determining the direction of arrival of the received signal.

In another embodiment, the at least one controller is further programmed to determine the direction of arrival of the received signal based at least on the time delay.

In another embodiment, the at least one controller is further programmed to apply an upsampling operation on a sequence of samples provided by the impulse response measurement to provide an upsampled IR signal.

In another embodiment, the at least one controller is further programed to perform a peak selection operation to the upsampled IR signal to account for reflections for the audio signal that reflect from one or more walls in a listening environment.

In another embodiment, the at least one controller is further programmed to apply a quadratic interpolation operation on the delay to provide the direction of arrival.

In another embodiment, the signature tone is an exponential sin sweep (ESS) based signal.

In another embodiment, the at least one controller includes an inverse filter to perform the impulse response (IR) measurement operation on the signature tone.

In at least another embodiment, an audio system including a first loudspeaker is provided. The first loudspeaker includes a plurality of microphones for receiving an audio signal including a signature tone from a second loudspeaker. The first loudspeaker also includes at least one controller being programmed to receive the audio signal from the plurality of microphones and to determine a direction of arrival of the received audio signal from the first loudspeaker based at least on the signature tone. The at least one controller is further programmed to perform an impulse response operation on the signature tone to determine a difference in peaks for the audio signal received at a first microphone and for the audio signal received at a second microphone to estimate a time delay between the receipt of the audio signal at the first microphone and at the second microphone prior to determining the direction of arrival of the received signal.

In at least another embodiment, a computer-program product embodied in a non-transitory computer readable medium that is stored in memory and that is programmed and executable by at least one controller in an audio system, the computer-program product comprising instructions to receive an audio signal including a first signature tone from a first loudspeaker via a plurality of microphones and to determine a direction of arrival of the received audio signal from the first loudspeaker based at least on a signature tone. The computer-program product comprises instructions to perform an impulse response operation on the signature tone to determine a difference in peaks for the audio signal received at a first microphone and for the audio signal received at a second microphone to estimate a time delay between the receipt of the audio signal at the first microphone and at the second microphone prior to determining the direction of arrival of the received signal.

In at least one embodiment, an audio system including a plurality of loudspeakers and a mobile device. The plurality of loudspeakers is capable of being positioned in a listening environment and being arranged to transmit an audio signal in the listening environment, each loudspeaker being programmed to determine a distance relative to other loudspeakers of the plurality of loudspeakers and to transmit a first signal indicative of the distance. The mobile device is programmed to receive the first signal from each of the loudspeakers and to determine a location for each loudspeaker in the listening environment based at least on the distance.

In at least one embodiment, a method is provided. The method includes transmitting, via a plurality of loudspeakers capable of being positioned in a listening environment, an audio signal in the listening environment and determining, by each loudspeaker, a distance relative to other loudspeakers of the plurality of loudspeakers and transmitting a first signal indicative of the distance. The method further includes receiving, at a mobile device, the first signal from each of the loudspeakers and to determine a location for each loudspeaker in the listening environment based at least on the distance.

In at least another embodiment, an audio system including a plurality of loudspeaker and a primary loudspeaker is provided. The plurality of loudspeakers is capable of being positioned in a listening environment and being arranged to transmit an audio signal in the listening environment, each loudspeaker being programmed to determine a distance relative to other loudspeakers of the plurality of loudspeakers and to transmit a first signal indicative of the distance. The primary loudspeaker is programmed to receive the first signal from each of the loudspeakers and to determine a location for each loudspeaker in the listening environment based at least on the distance.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

FIG. 14 depicts one example of the reference speaker selection as performed by the method of FIG. 11;

FIG. 15 depicts an example of initial layout estimation as performed by the method of FIG. 11;

FIG. 16 depicts another example of the initial layout estimation as performed by the method of FIG. 11;

FIG. 17 depicts an example of candidate coordinate estimations as performed by the method of FIG. 11;

FIG. 18 depicts an example of the best coordinate selection as performed by the method of FIG. 11.

DETAILED DESCRIPTION

Figure 1:
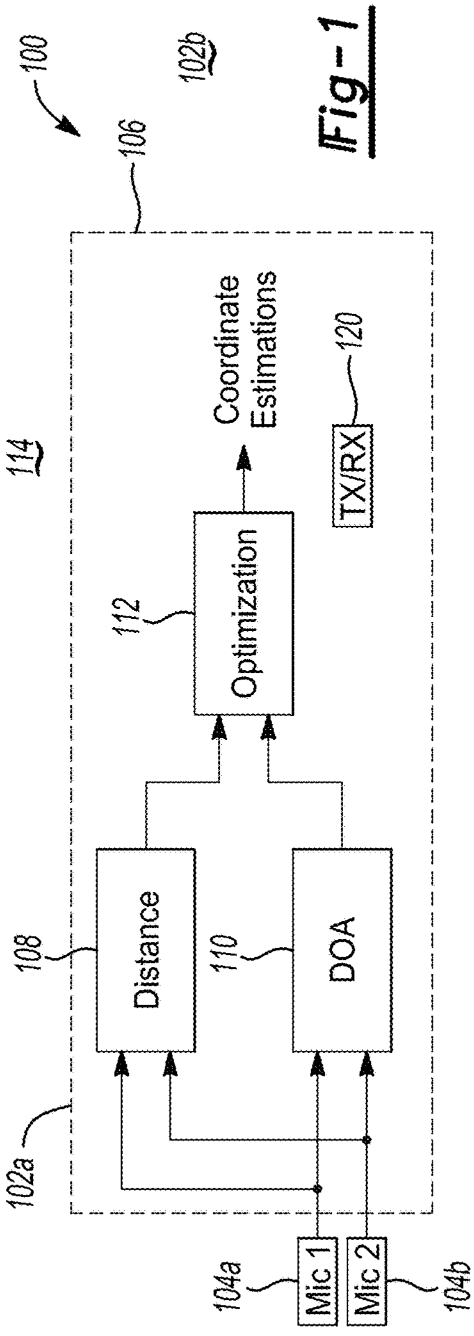
FIG. 1 generally depicts a system for performing device localization and optimization utilizing an audible signal in accordance with one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

One of the aims of the present Applicant is utilizing multiple loudspeakers to generate immersive sound. Since these devices (or loudspeakers) may be wireless, the location for each loudspeaker in a listening environment needs to be previously setup or established. Speaker calibration is attributed to locating a location for the loudspeakers. Various auto calibration solutions estimate, for example, an azimuth of speakers using direction of arrival (DOA) estimation. Various details related to DOA estimation may be found in U.S.

Ser. No. 18/204,165 entitled "BOUNDARY DISTANCE SYSTEM AND METHOD" as filed on May 31, 2023; U.S. Ser. No. 18/204,159 entitled "APPARATUS, SYSTEM AND/OR METHOD FOR NOISE TIME-FREQUENCY MASKING BASED DIRECTION OF ARRIVAL ESTIMATION FOR LOUDSPEAKER AUDIO CALIBRATION" as filed on May 31, 2023; and in U.S. Ser. No. 18/204,150 entitled "SYSTEM AND/OR METHOD FOR LOUDSPEAKER AUTO CALIBRATION AND LOUDSPEAKER CONFIGURATION LAYOUT ESTIMATION" as filed on May 31, 2023 the disclosures of which are hereby incorporated by reference therein.

DOA methods may aid with channel assignment for immersive sound generation. However, various DOA methods may not estimate the distance. Thus, the present disclosure provides an apparatus, system, and/or method for device localization that can estimate device distance and angle. The distance information can be exploited in the following manner since such information: (i) provides better graphical user interface (GUI); (ii) adjusts device volume based on device distance, and (iii) improves the robustness of the device localization method in case of high noise source presence, obstruction between devices, or outliers. The distance between the devices (e.g., loudspeakers) can be calculated with the information of time of flight (ToF) and sound velocity. The transmission times for the loudspeakers are required to synchronized in order to find out the ToF. However, global time may not be possible for different loudspeakers since such loudspeakers don't have common processors. Hence, the present disclosure employs an asynchronous distance estimation method for speaker localization. Also, a time frequency masking (TFM) method as disclosed herein empowers the distance estimation method in low SNR conditions which is not avoidable in realistic scenarios. The present disclosure estimates loudspeaker to loudspeaker impulse response (IR) for DOA estimation. At that point, the estimated distances and DOAs are combined to obtain more robust estimates in the case of low signal to noise ratios (SNR) and/or the presence of obstruction between the loudspeakers or outliers. In short, the present disclosure provides, but not limited to, a TFM based asynchronous distance estimation system/method, IR based DOA estimation system/method, and optimization system/method that combines distance and DOA estimations for robust final estimations for speaker calibration.

In general, auto calibration may be a step for immersive sound generation that utilizes multiple loudspeakers. By including distance estimation to angle estimation of loudspeakers, these aspects enable a more robust device (e.g., loudspeaker) localization and adds more features to loudspeaker products such as improved graphical user interface (GUI) or loudspeaker-based volume adjustment. The present disclosure utilizes the TFM to increase robustness to avoid any failure in the auto-calibration that might cause negative feedback from listeners. The present disclosure provides loudspeaker localization, in terms of distance and azimuth and a method that utilizes TFM based distance estimation and IR based DOA estimation.

Various loudspeaker suppliers provide different loudspeaker categories together to form one ecosystem. In general, loudspeakers communicate with one another to provide sound immersion. Thus, in light of the present disclosure, multiple loudspeakers may achieve higher audio quality using immersive sound. The locations of the speakers provide prior information for immersive sound generation. Hence, auto-calibration is needed between the loudspeaker such loudspeakers generate immersive sound.

FIG. 1 generally depicts a system 100 for performing device localization and optimization utilizing an audible signal in accordance with one embodiment. In general, the system 100 depicts a high-level generalization for performing loudspeaker localization. The system 100 generally includes a plurality of loudspeakers 102*a*-102*n* (or "102") with each loudspeaker 102 having a plurality of microphones 104*a*-104*b* ("104), a controller 106, and memory 107. The controller 106 includes a distance estimation block 108, a direction of arrival (DOA) estimation block 110, and an optimization block 112. The controller 106 executes code stored on the memory 107 to generate coordinate estimates of the loudspeaker 102 that may be transmitted to a mobile device 114. For example, the controller 106 interfaces with audio captured by one or more of the microphones 104. The controller 106 performs DOA, distance estimation based on the captured audio provided by the microphones 104. The optimization block 112 exploits redundant paths and estimations to increase robustness the final estimation of the coordinate estimations. The coordinate estimations generally provide the location of the loudspeaker 102*a* as positioned in a listening environment 116 to the mobile device 114 and/or to other loudspeakers 102*b*-102*n* positioned in the listening environment 116.

Figure 2:
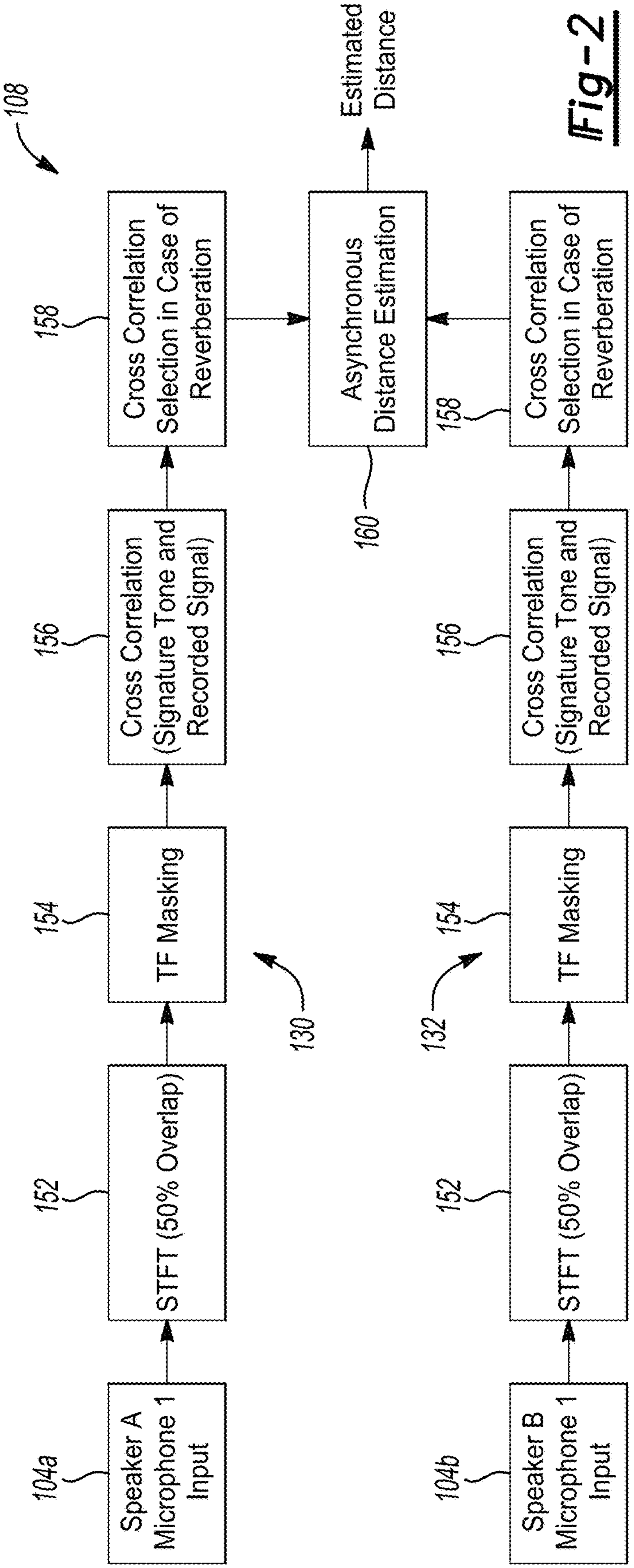
FIG. 2 generally depicts a detailed implementation of a distance estimation block for the system of FIG. 1 in accordance with one embodiment.

FIG. 2 depicts a more detailed block diagram of the distance estimation block 108 in accordance with one embodiment. In general, the distance estimation block 108 is configured to determine an overall distance between the loudspeaker 102*a* and the loudspeaker 102*b* while such loudspeakers are positioned in the listening environment 116. As will be described further below, each of the loudspeakers 102*a* and 102*b* transmit a predetermined audible signal (or chirp signal) which serves as a signature signal 184 (or a signature tone) (see FIG. 3 for reference) during a calibration process. These aspects and others will be discussed in more detail below.

The distance estimation block 108 generally includes a first circuit 130 and a second circuit 132. In general, the microphone 104*a* may provide the captured audio signal to components that comprise the first circuit 130. Similarly, the microphone 104*b* may provide the captured audio signal to components that comprise the second circuit 132. It is recognized that that the distance estimation block 108 may not need any output from both the first circuit 130 and the second circuit 132 to provide the estimated distance. For example, an output from either the first circuit 130 or the second circuit 132 may only be required. However, it is recognized that the distance estimation block 108 may utilize outputs from both the first circuit 130 and the second circuit 132 to provide the estimated distance.

Each of the first circuit 130 and the second circuit 132 includes a Short Time Fourier Transform (STFT) block 152, a Time Frequency (TF) masking block 154, a first cross correlation block 156, and a second cross correlation block 158. An asynchronous distance estimation block 160 receives an output from the first circuit 130 and/or the second circuit 132. In general, with the asynchronous implementation, the various loudspeakers 102 within the system 100 do not share a common clock or timing mechanism. The manner in which the blocks 152, 154, 156 and 158 operate will be described in more detail below and it is recognized that the functionality provided by such blocks 152, 154, 156, and 158 are similar to the first circuit 130 and to the second circuit 132.

The SFTF block 152 converts the captured audio provided from the microphone 104*a* or 104*b* from a time domain into a frequency domain. In one example, the SFTF block 152 applies a predetermined overlap (e.g., 50%) to the captured audio signal provided by the microphone 104*a* or 104*b*. In general, it may be advantageous to process the signal frame by frame. For example, the audio may be transmitted as a plurality of frames and each frame may be captured by the controller 106 at 100 ms per instance. With the overlap noted above, the controller 106 processes the first half of a previously capture frame plus a second half of currently captured frame.

Figure 3:
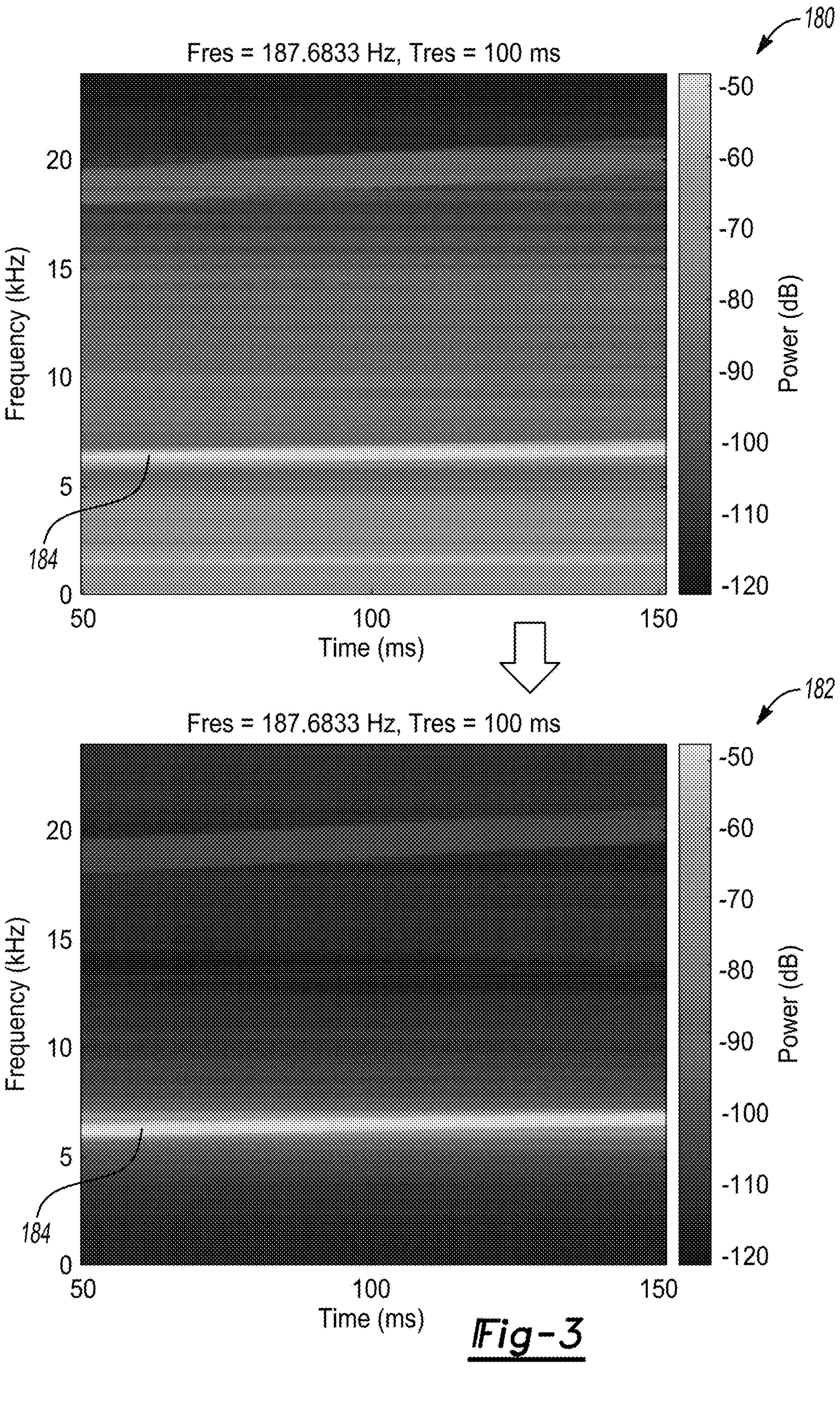
FIG. 3 generally depicts one example of time-frequency masking as applied to noisy mixtures.

The TF masking block 154 applies time-frequency masking to an output of the SFTF block 152. In general, the TF masking block 154 applies the masking to provide speech separation and enhancement. The TF based masking may eliminate a significant amount of noise dominated T-F bins to minimize the effects of noises and vibrations. This may be generally seen in FIG. 3. For example, plot 180 as generally shown in connection with FIG. 3 illustrates the T-F masking being applied to a noise sweep sine of between 6-7 kHz. The plot 180 illustrates the presence of the signature signal 184 (or the signature tone 184) that is embedded within the captured audio by the microphones 104*a* and/or 104*b*. During the calibration phase, an audio source, such as the mobile device 114 controls the loudspeakers 102*a* and 102*b* to generate an audio signal that includes the signature signal 184 for purposes of configuring the loudspeakers 102 in the listening environment 116. Plot 182 as also shown in connection with FIG. 3 illustrates the outcome of when the T-F masking is applied. As shown, by applying T-F masking, it is possible to extract the signature signal 184 from the noise mixture.

The TF masking block 154 may utilize one or more of an ideal binary mask (IBM), an ideal ratio mask (IRM), and a complex ideal ratio mask (cIRM) to perform the TF masking. It is recognized however that the type of TF masking technique employed by TF masking block 154 should not modify phase information on the captured audio signal. Assuming for the sake of example that the TF masking block 154 employs IRM, since the tone (i.e., calibration tone) of the signature signal 184 may be known, the IRM coefficients may be calculated as follows:

$$IRM(t,f)=\left(\frac{|S(t,f)|^2}{|S(t,f)|^2+|N(t,f)|^2}\right)^{\beta} \quad (1)$$

While S(t, f) corresponds to a frequency response of the signature signal 184, N(t,f) represents A noise spectrum and β is the smoothing factor. As noted above, since knowledge of the signature signal 184 is known, S(t, f) can be calculated. The denominator in equation (1) may correspond to the captured signal at the microphone 104*a* or 104*b*. After calculating the mask, the enhanced signal can be calculated using the multiplication of the captured signal with the mask as in equation (2).

$$E(t,f)=IRM(t,f)\cdot Y(t,f) \quad (2)$$

E(t, f) represents an enhanced signal, and Y(t, f) is the captured signal at the microphone 104*a* or 104*b*. Then, the enhanced signal is employed by the first cross correlation block 156.

The first cross correlation block 156 determines the cross correlation between the signature signal 184 (e.g., the signature signal 184 as transmitted by loudspeaker 102*a* which is clean signal and not exposed to the environment) and the acquired signal (or captured signal at loudspeaker 102*b*) to find a delay which corresponds to when the loudspeaker 102*a* transmits the signature signal 184 and when the microphone 104*a* or 104*b* of the second loudspeaker 102*b* captures the signature signal 184. The noted delay may be used to determine when the signature tone 184 had begun playing. This delay corresponds to one of $t_{SA1}$, $t_{SB1}$, $t_{SA3}$ and $t_{SA4}$ as described in more detail below. The first cross correlation block 156 executes the following equation:

$$r_{x_1x_2}=x_1(m)*x_2(-m) \quad (3)$$

Where $x_1$ (m) corresponds to the signature signal and $x_2(-m)$ corresponds to the acquired (or captured) signal. In addition, the distance estimation block 108 includes the second cross correlation block 158 for purposes of mitigating reverberation. For example, reverberation causes undesired peaks in cross-correlation. One of these peaks may correspond to a maximum peak. In this case, it may not be possible to select the true maximum peak to find the delay due to such reverberation. The second cross correlation block 158 locates the first maximum peak in the cross-correlation and monitors for the first peak that satisfies the following criteria in as set forth in equation (6).

$$\hat{\eta}_{max}=\underset{m_1}{\operatorname{argmax}}\, r_{x_1x_2}(m_1)\ 0\le m_1\le T_1 \quad (4)$$

$$\hat{\eta}_{pre}=\underset{m_2}{\operatorname{argmax}}\, r_{x_1x_2}(m_2)\ 0\le m_2<\hat{\eta}_{max} \quad (5)$$

$$\tau\cdot r_{xy}(\hat{\eta}_{max})\le r_{xy}(\hat{\eta}_{pre}) \quad (6)$$

$$0.5\le\tau\le 0.8 \quad (7)$$

$\hat{\eta}_{max}$ corresponds to a max peak index for cross-correlation between $x_1$ and $x_2$. $\hat{\eta}_{pre}$ is previous peak index for cross-correlation between $x_1$ and $x_2$. $m_1$ and $m_2$ represents time index. $T_1$ denotes the length of the cross-correlation and τ is the threshold. The second cross correlation block 158 executes equations 4-7 to select the correct peak in the correlation in case of high reverberation. If there is any peak in the correlation satisfies that satisfies the criteria in Eq. 6, the second cross correlation block 158 selects the $\hat{\eta}_{max}$ as the delay. In general, the second cross correlation block 158 seeks to decrease the effect of reverberation to obtain the delay.

In general, the estimated delay(s) provided by the first cross correlation block 156 may be provided to the distance estimation block 160. The distance estimation block 160 may then perform distance estimation using a BeepBeep method. It is recognized that the BeepBeep method includes transmitting the signature signal 184 in addition to performing one or more of the calculations noted in connection with FIG. 4. The distance estimation block 108 at least partly provides one implementation for processing and extracting the received signature signal 184 at any one or more of the loudspeakers 102. The BeepBeep method generally corresponds to a high-accuracy ranging mechanism. In general, the distance estimation block 160 may achieve high accuracy through the use of (1) two-way sensing, (2) self-recording, and (3) sample counting. The system 100 utilizes the t signature signal 184 as transmitted by each of the loudspeakers 102a and 102b to determine the estimated distance between the loudspeaker 102a and the loudspeaker 102b.

Figure 4:
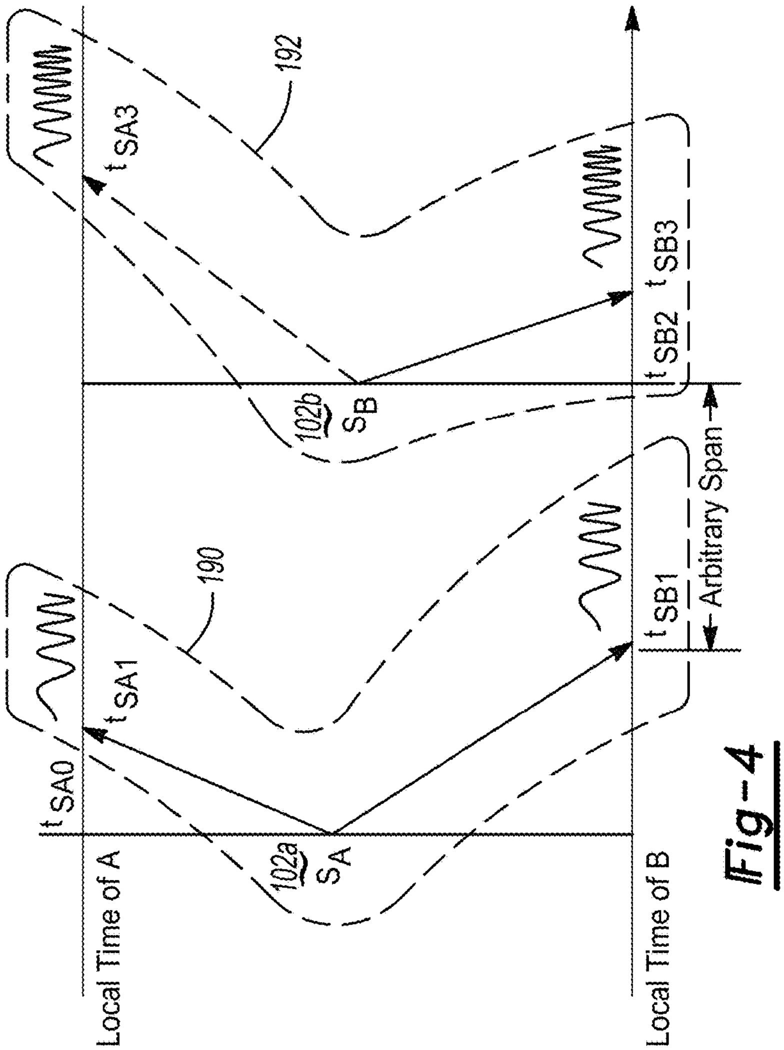
FIG. 4 generally depicts an event sequence for a Beep Beep method in accordance with one embodiment.

FIG. 4 generally depicts an event sequence that may occur between the loudspeakers 102a (or loudspeaker $S_A$ as referenced in FIG. 4) and another loudspeaker 102b (or loudspeaker $S_B$ as reference in FIG. 4) in the listening environment 116 while the BeepBeep method is employed by both loudspeakers 102a, 102b. With continuing reference to FIGS. 1, 3, and 4, the controller 106 in each of the loudspeakers 102a and 102b are generally configured to emit (or transmit) a predetermined audible signal (or chirp signal) into the listening environment 116. In turn, each loudspeaker 102a and 102b records the other chirp signal provided the other loudspeaker 102a or 102b via their respective microphones 104a, 104b. Each recording (or captured audio signal) should include two identical signals that are captured by their microphones 104a, 104b. For example, one captured signal may correspond to the chirp signal emitted by its own loudspeaker 102a and the other capture signal may correspond to the chirp signal emitted by the other loudspeaker 102b.

Each loudspeaker 102a and 102b may then count a number of samples between the two captured audio signals and then divide the number by a sampling rate to obtain the elapsed time between the time of arrival of the capture audio signal received at the microphones 104a and 104b. For example, the loudspeaker 102a may count the number of samples between the first captured signal at one of the microphones 104a or 104b and the second captured signal at the other microphone 104a or 104b and then divide the number by a sampling rate to obtain an elapsed time between the time of arrival of the captured audio signals received at the microphones 104a and 104b. In a similar manner, the loudspeaker 102b may count the number of samples between the first captured signal at one of the microphones 104a or 104b and the second captured signal at the other microphone 104a or 104b and then divide the number by a sampling rate to obtain an elapsed time between the time of arrival of the captured audio signals received at the microphones 104a and 104b. Each of the loudspeaker 102a and 102b may include a transceiver 120 to enable wireless bi-directional communication between one another. For example, the loudspeakers 102a and 102b may communicate with one another and/or with the mobile device 114 via BLUETOOTH or WIFI or another suitable alternative. In this regard, the loudspeakers 102a and 102b wirelessly transmit the elapsed time information to one another. The differential of the two elapsed times represents the sum of time of flight of the two captured signals. Further, the differential of two elapsed times represents (or the sum of the time of flight) which is, for example, two times the distance (or 2*D) between the loudspeaker 102a and the loudspeaker 102b.

As noted above, FIG. 4 illustrates an event sequence for the BeepBeep method with respect to the loudspeaker 102a and the loudspeaker 102b each transmitting the chirp signal. The chirp signal may correspond to a simple output that sounds similar to a Beep Beep.

As noted above, the loudspeaker 102a may be represented by $S_A$ and the loudspeaker 102b may be represented by $S_B$. Thus, as shown in FIG. 4, loudspeaker 102a transmits the chirp signal 184 (i.e., the signature signal 184) where the signal is received at both the loudspeaker 102a and the loudspeaker 102b. "Local Time of A" as illustrated on the top horizontal line of FIG. 4 generally corresponds to the time of chirp signal being received at the loudspeaker 102a (or $S_A$). "Local Time of B" as illustrated on the bottom horizontal line of FIG. 4 generally corresponds to the time of the chirp signal being received at the loudspeaker 102b (or $S_B$).

Sequence 190 generally illustrates that the loudspeaker 102a transmits, at a time $t_{SA0}$, a first chirp signal that is first received at the loudspeaker 102a at a time that corresponds to $t_{SA1}$ and the first chirp signal is later received at the loudspeaker 102b at a time that corresponds to $t_{SB1}$. As noted above, since the loudspeaker 102a transmits the first chirp signal into the listening environment 116, the microphone 104a or 104b of the loudspeaker 102a will be the first to capture the first chirp signal. At a time shortly after that, the loudspeaker 102b captures the first chirp signal via the microphones 104a or 104b.

Sequence 192 generally illustrates that the loudspeaker 102b transmits, at a time $t_{SB2}$, a second chirp signal that is first received at the loudspeaker 102b at a time that corresponds to $t_{SB3}$ and the second chirp signal is later received at the loudspeaker 102a at a time that corresponds to $t_{SA3}$. As noted above, since the loudspeaker 102b transmits the second chirp signal into the listening environment 116, the microphone 104a or 104b of the loudspeaker 102b will be the first to capture the first chirp signal. At a time shortly after that, the loudspeaker 102a captures the second chirp signal via the microphones 104a or 104b.

For reference, the variables as illustrated in FIG. 4 in addition to variables $d_{A,A}$ and $d_{B,B}$ may be generally defined by the following:

$t_{SA1}$: the time of the first chirp signal arriving at microphones 104a, 104b of loudspeaker 102a.

$t_{SB1}$: the time of the first chirp signal arriving at microphones 104a, 104b of loudspeaker 102b.

$t_{SA3}$: the time of the second chirp signal arriving at microphones 104a, 104b of loudspeaker 102a.

$t_{SA4}$: the time of the signal arriving at microphones 104a, 104b of the loudspeaker 102b.

$d_{A,A}$: distance between a speaker driver for the loudspeaker 102a and the microphone 104a or 104b for the loudspeaker 102a.

$d_{B,B}$: distance between a speaker driver and the loudspeaker 102b for the microphone 104a or 104b for loudspeaker 102b.

Based on the foregoing, the following equations are provided to illustrate the manner in which the distances are calculated:

$$d_{A,A} = c \cdot (t_{SA1} - t_{SA0})$$

$$d_{A,B} = c \cdot (t_{SB1} - t_{SA0})$$

$$d_{B,A} = c \cdot (t_{SA3} - t_{SB2})$$

$$d_{B,B} = c \cdot (t_{SB3} - t_{SB2})$$

$$D = \frac{1}{2} \cdot (d_{A,B} + d_{B,A})$$

$$D = \frac{c}{2} \cdot ((t_{SB1} - t_{SA0}) + (t_{SA3} - t_{SB2}))$$

$$D = \frac{c}{2} \cdot (t_{SB1} - t_{SB2} + t_{SB3} - t_{SB3} + t_{SA3} - t_{SA0} + t_{SA1} - t_{SA1})$$

$$D = \frac{c}{2} \cdot ((t_{SA3} - t_{SA1}) - (t_{SB3} - t_{SB1}) + (t_{SB3} - t_{SB2}) + (t_{SA1} - t_{SA0}))$$

$$D = \frac{c}{2} \cdot ((t_{SA3} - t_{SA1}) - (t_{SB3} - t_{SB1})) + \frac{1}{2} \cdot (d_{A,B} + d_{B,B})$$

c as noted above in the equations corresponds to the speed of light. D generally corresponds to the distance between the loudspeaker 102*a* and the loudspeaker 102*b*.

Figure 5:
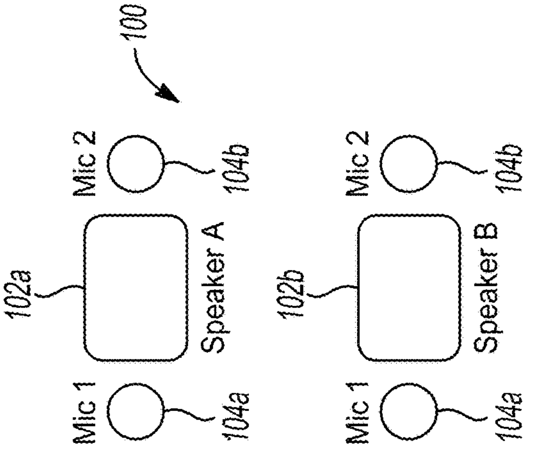
FIG. 5 generally depicts a loudspeaker system in accordance with one embodiment.

FIG. 5 generally depicts the system 100 of FIG. 1 with illustrates the positioning of the microphones 104*a* and 104*b* on the loudspeaker 102*a* and the loudspeaker 102*b* in accordance with one embodiment. In general, the distance estimation block 160 as set forth in FIG. 2 may calculate the distance between the loudspeaker 102*a* and the loudspeaker 102*b* based on the following equation:

$$\text{distance}_{S_A S_B} = \frac{\text{distance}_{M_{A1}M_{B1}} + \text{distance}_{M_{A1}M_{B2}} + \text{distance}_{M_{A2}M_{B1}} + \text{distance}_{M_{A2}M_{B2}}}{4}$$

For purposes of clarification, $\text{distance}_{M_{A1}M_{B1}}$ corresponds to an overall distance between the microphone 104*a* of the loudspeaker 102*a* and the microphone 104*a* of the loudspeaker 102*b*, $\text{distance}_{M_{A1}M_{B2}}$ corresponds to an overall distance between the microphone 104*a* of the loudspeaker 102*a* and the microphone 104*b* of the loudspeaker 102*b*, $\text{distance}_{M_{A2}M_{B1}}$ corresponds to an overall distance between the microphone 104*b* of the loudspeaker 102*a* and the microphone 104*a* of the loudspeaker 102*b*, and $\text{distance}_{M_{A2}M_{B2}}$ corresponds to an overall distance between the microphone 104*b* of the loudspeaker 102*a* and the microphone 104*b* of the loudspeaker 102*b*.

Each of the $\text{distance}_{M_{A1}M_{B1}}$, $\text{distance}_{M_{A1}M_{B2}}$, $\text{distance}_{M_{A2}M_{B1}}$, and $\text{distance}_{M_{A2}M_{B2}}$ may be determined based on the values as set forth in connection with FIG. 4 which are reproduced below for reference:

$d_{A,A}=c\cdot(t_{SA1}-t_{SA0})$—(e.g., the distance between microphone 104*a* or 104*b* and the loudspeaker driver of loudspeaker 102*a*).

$d_{A,B}=c\cdot(t_{SB1}-t_{SA0})$—(e.g., the distance between microphone 104*a* or 104*b* of the first loudspeaker 102*a* (speaker A) and the loudspeaker driver of loudspeaker 102*b* (speaker B)) (tsas etc. are TOA)

$d_{B,A}=c\cdot(t_{SA3}-t_{SB2})$—(e.g., the distance between microphone 104*a* or 104*b* of the loudspeaker 102*b* (speaker B) and the loudspeaker driver of the loudspeaker 102*a* (speaker A))

$d_{B,B}=c\cdot(t_{SB3}-t_{SB2})$ (e.g., the distance between microphone 104*a* or 104*b* of the loudspeaker 102*b* (speaker B) and the loudspeaker driver of the loudspeaker 102*b* (speaker B))

In general, variables $t_{SA0}$, $t_{SA1}$, $t_{SA2}$, $t_{SA3}$, $t_{SB0}$, $t_{SB1}$, $t_{SB2}$, and $t_{SB3}$ are utilized to perform distance estimation. It recognized that at least both a first signature tone from the loudspeaker 102*a* and a second signature tone from the loudspeaker 102*b* is needed to perform distance estimation as described above. It is also recognized that in one embodiment, the mobile device may not be determining the distance between the loudspeakers 102*a* and 102*b*, etc., but rather the loudspeakers 102*a*, 102*b* themselves and that this distance, once determined, may be transmitted from one or more of the loudspeakers 102*a* and 102*b* to the mobile device. In another embodiment, the loudspeakers 102*a*, 102*b* may transmit information corresponding to the TOA signals as identified above to the mobile device such that the mobile device is capable of determining the distance between loudspeakers 102*a*, 102*b* based on the received TOA signals.

Figure 6:
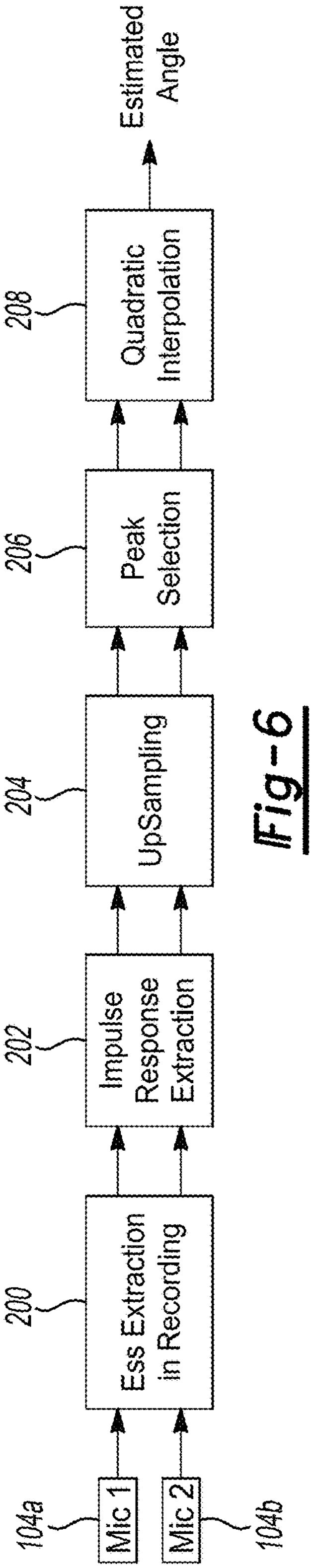
FIG. 6 generally depicts a system that performs direction of arrival (DOA) estimation for the system of FIG. 1 in accordance with one embodiment.

FIG. 6 generally depicts a detailed implementation of the DOA estimation block 110 for the system 100 of FIG. 1 in accordance with one embodiment. In general, the DOA estimation block 110 utilizes an impulse response based on direction of arrival (DOA) estimation. For example, the DOA estimation block 110 includes an exponential sine sweep (ESS) extraction block 200, an IR extraction block 202, an upsampling block 204, a peak selection block 206, and a quadratic interpolation block 208. The DOA estimation block 110 utilizes loudspeaker 102*a* and loudspeaker 102*b* IR to estimate the orientation/DOA.

Figure 7:
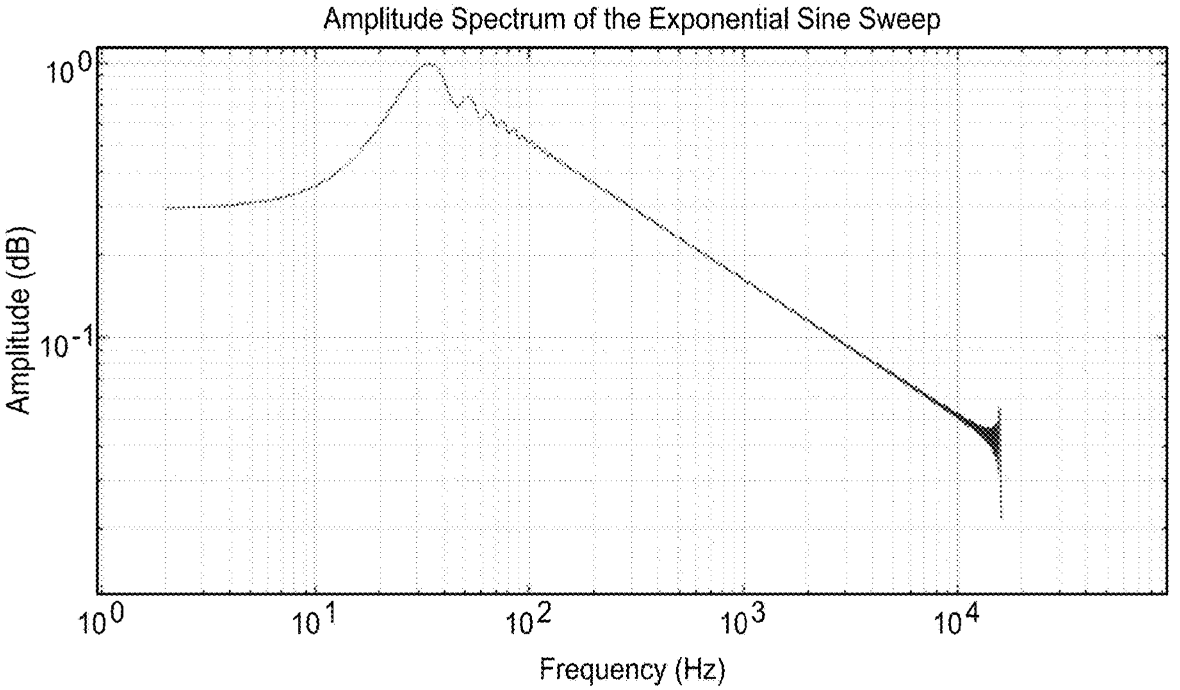
FIG. 7 generally depicts one example of an amplitude spectrum of an exponential sine sweep in accordance with one embodiment.

In general, the loudspeaker 102*a* plays an ESS based signal (or second signature signal (or second signature tone)) while the loudspeaker 102*b* records this signal. It is recognized that after this event occurs, the loudspeaker 102*b* may also play the ESS based signal while the loudspeaker 102*a* records this signal. FIG. 7 generally illustrates a frequency response of the ESS signal that is transmitted by the loudspeaker 102. The ESS based signal as transmitted by the loudspeaker 102 may generally be defined by the following:

$$s(t) = \sin(\theta(t)) = \sin\left(K\cdot\left(e^{-\frac{t}{L}} - 1\right)\right) \tag{8}$$

where $$K = \frac{\omega_1 T}{\ln\left(\frac{\omega_1}{\omega_2}\right)},\ L = \frac{T}{\ln\left(\frac{\omega_1}{\omega_2}\right)} \tag{9}$$

T denotes the time duration of the sweep. $\omega_1$ and $\omega_2$ are the start and end frequency, respectively. Since the frequencies of the ESS varies, the energy depends on a rate of the instantaneous frequency which is given below:

$$\omega(t) = \frac{d\{\theta(t)\}}{dt} = \frac{K}{L}\cdot e^{\frac{t}{L}} \tag{10}$$

The IR extraction block 202 may include an inverse filter (not shown). In general, the IR extraction block 202 may utilize the inverse filter (or deconvolution) to measure a device-to-device impulse response (IR). Since the time reversed energies for the ESS decreases 3 dB/octave, the inverse filter of the IR extraction block 202 includes a 3 dB/octave increase in its energy spectrum to achieve a flat spectrogram. Assume h(t) is the room impulse response, r(t) is excited room impulse response, and f(t) is the inverse filter. Then the impulse response may be found based on the equation below:

$$h(t) = r(t) * f(t) \tag{11}$$

f(t) may be created using post-modulation, which is applying amplitude modulation envelope of, for example, +6 dB/octave to the spectrum of a time reversed signal. The general form of the post-modulation function is as follows:

$$m(t) = \frac{A}{\omega(t)} = A\left(\frac{K}{L}e^{t/L}\right)^{-1} \tag{12}$$

A denotes the constant for the modulation function. For time t=0, $\omega(t)=w_1$, and for getting unity gain at time t=0:

$$1 = \frac{A}{\omega(0)} = \frac{A}{\omega\_1} \rightarrow A = \omega_1 \tag{13}$$

Figure 8:
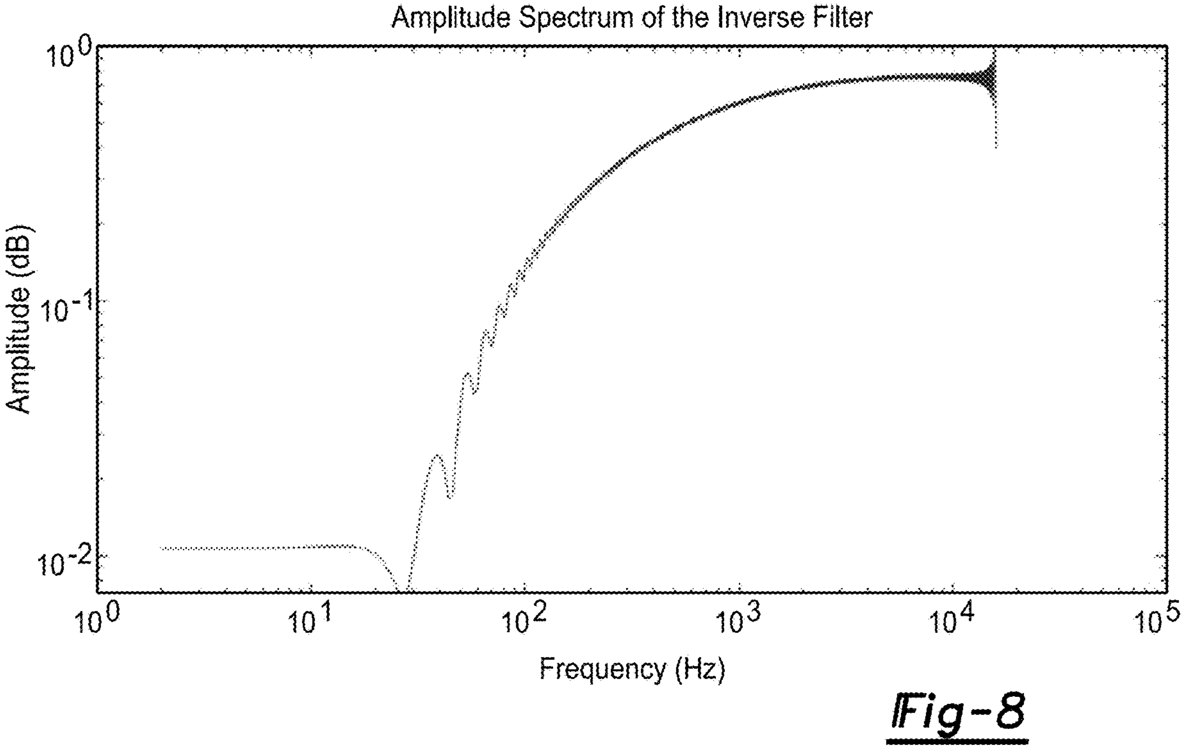
FIG. 8 generally depicts one example of an amplitude spectrum for an inverse filter in accordance with one embodiment.

Then, the modulation function becomes:

$$m(t) = \frac{\omega_1}{\omega(t)} \tag{14}$$

f(t) now has 3 dB/octave increase in frequency after modulating the time reversed signal with m(t). FIG. 8 generally depicts an amplitude spectrum of the inverse filter of the IR extraction block 202. In general, the IR is obtained by utilizing Eq. 11 above which corresponds to the convolution of the ESS and the inverse filter.

Figure 9:
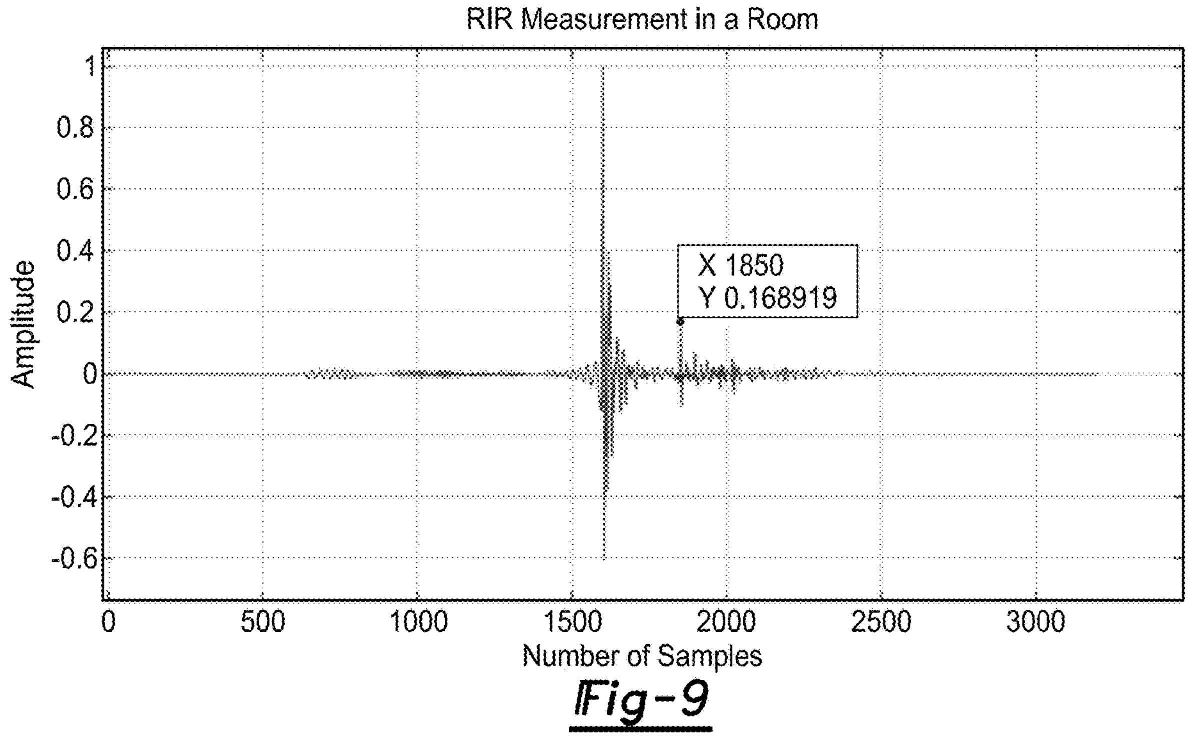
FIG. 9 generally depicts one example of the system of FIG. 1 performing an impulse response (IR) measurement utilizing an exponential sine sweep (ESS) method in accordance with one embodiment.

FIG. 9 generally illustrates one example of an IR measurement while utilizing the ESS signal. The IR displayed in FIG. 9 corresponds an output provided by a single microphone 104*a* or 104*b*. Thus, DOA estimation block 110 (i.e., the IR extraction block 202) performs a separate IR measurement (or IR estimate) on the output provided by the microphone 104*a* and the output provided by the microphone 104*b*. Then, the IR extraction block 202 determines a difference between peaks for each IR measurement from the outputs for the microphones 104*a* and 104*b* to estimate time delay. However, it is recognized that the spacing and reflection between the microphone 104*a* and 104*b* degrades the DOA estimation results. To account for these issues, the DOA estimation block 110 includes the upsampling block 204 and the peak selection block 206 to improve performance (see FIG. 6)

Figure 10:
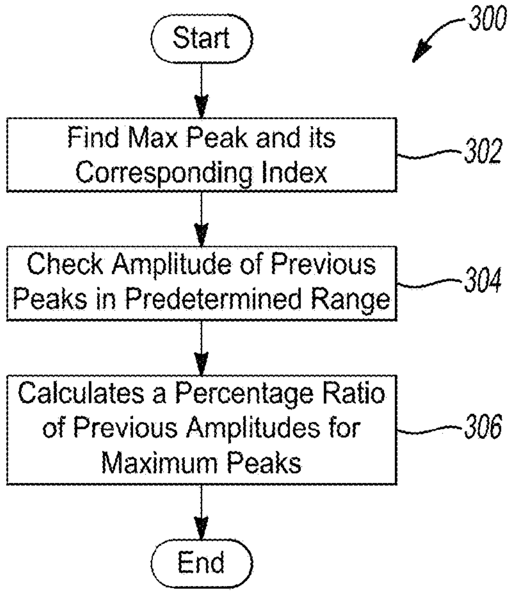
FIG. 10 generally depicts a method for performing peak selection in accordance with one embodiment.

The upsampling block 204 upsamples a sequence of samples of the measured IR. The upsampling block 204 produces an approximation of the sequence that would have been obtained by sampling the IR signal at a higher rate. For example, the upsampling block 204 may increase an upsampling rate, for example, up to five times to increase a time difference of arrival (ToA) resolution. The peak selection block 206 applies peak selection to the upsampled IR signal. The peak selection performed by the peak selection block 206 accounts for reflections that may occur with respect to the transmitted audio from the loudspeakers 102*a* and 102*b* that may reflect from walls within the listening environment 116. These reflections create strong, undesired peaks in IR estimation which may result in erroneous ToA estimation. Thus, to account for, and to minimize or eliminate spurious or undesired peaks in the upsampled IR signal, the controller 106 (i.e., the peak selection block 206) may perform the method 300 as set forth in FIG. 10 to perform peak selection, or for example, earlier peak selection.

In operation 302, the peak selection block 206 for the loudspeaker 102*a* and/or the loudspeaker 102*b* locates a maximum peak of the IR signal and its corresponding index.

In operation 304, the peak selection block 206 checks the amplitude of previous peaks in a predetermined range. For example, the peak selection block 206 first finds a maximum peak and then looks at an amplitude of previous peaks.

In operation 306, the peak selection block 206 calculates a percentage ratio of previous amplitudes based on such previous amplitudes as provided in operation 304. The peak selection block 206 calculates the percentage ratio of previous amplitudes and maximum peak amplitude based on the equation provided below:

$$PR = \frac{\text{Pre Peak Amplitude}}{\text{Max Peak Amplitude}} \times 100 \tag{15}$$

For example, the peak selection block 206 starts from a first peak. For example, if the peak selection block 206 determines that the percentage ratio is higher than a threshold, then the peak selection block 206 selects this peak as direct path and the peak selection block 206 use this peak for ToA estimation. In one example, the threshold may be 0.6 to 0.7. If not, then the peak selection block 206 determines that the max peak is the direct path and uses the index of max peak for ToA estimation. With this case and in general, since the previous peak does not exceed the threshold, the first peak that was detected before the previous peak will be considered the maximum peak and will be used for purposes of determining the time of arrival. Time of arrival (ToA) generally corresponds to a direction of arrival of signals at the loudspeaker 102 relative to other signals transmitted from other speakers 102 in the system 100. The ToA corresponds to a signal time of arrival at a particular loudspeaker 102. ToA can be used as DOA as well as Distance Estimation.

Referring back to FIG. 6, the DOA estimation block 110 may calculate or estimate the DOA by using a time delay between the microphones 104*a* and 104*b*. Therefore, the resolution of the time-delay may be limited by the spacing of the microphones 104*a* and 104*b* and the sampling frequency. Since the DOA estimation block 110 utilizes the sampling frequency, the DOA estimation block 110 (e.g., the quadratic interpolation block 208) may also utilize an interpolation technique to increase the resolution further. Thus, the quadratic interpolation block 208 utilizes quadratic interpolation for increasing time-delay resolution. The quadratic interpolation block 208 may utilize the max peak in cross-correlation and it's two neighbors for the quadratic interpolation. One example of quadratic interpolation can be found in Tashev, Ivan Jelev. *Sound capture and processing: practical approaches*, Section 6.4. Practical Approaches and Tips, John Wiley & Sons, 2009. Assume G ($k_m$T) is a max peak for the IR signal, and G(($k_m$−1)T) and G(($k_m$+1)T) are neighbors of the max peak for the IR signal. The quadratic interpolation block 208 may perform interpolation via the quadratic polynomial:

$$a[(k_m - 1)T]^2 + b[(k_m - 1)T] + c = G((k_m - 1)T) \tag{16}$$

$$a[k_m T]^2 + b[k_m T] + c = G(k_m T) \tag{17}$$

$$a[(k_m + 1)T]^2 + b[(k_m + 1)T] + c = G((k_m + 1)T) \tag{18}$$

where a, b, c may be solved using Eq's 16-18. Then, the interpolated value of the delay can be calculated by the quadratic interpolation block 208 as shown below:

$$\tau_i = -\frac{b}{2a} \tag{19}$$

($\tau_i$ is time difference of arrival (TDOA). As noted above, each loudspeaker 102*a* and 102*b* will perform distance estimation. Once each loudspeaker 102*a* and 102*b* performs distance estimation, the optimization block 112 for each loudspeaker 102*a* and 102*b* may then be executed. Generally, once each loudspeaker 102*a* and 102*b* completes its estimations in terms of ToA, each of the loudspeakers 102*a* and 102*b* transmits information corresponding to the TOA (or DOA) information to either loudspeaker 102*a*, 102*b* and/or to the mobile device 114. The mobile device 114 may utilize or coalesce the TOA information to optimize the final estimation and to find the overall distance. Equation 19 generally provides, among other things, the delay between inputs from the microphones 104*a* and 104*b*. This delay may be converted to an angle by applying formula:

$$\hat{\theta} = \cos^{-1}\frac{\hat{\eta}c}{d} \tag{20}$$

where $\hat{\eta}$ is the estimate of the sample delay as noted above, c is a speed of sound, and d is a distance between the microphones. It is recognized that each loudspeaker 102 in the system 100 may transmit the at least one of the distance estimation and the DOA information to other loudspeakers 102 (or to a primary loudspeaker that is designated to determine coordinates for each loudspeaker 102) in the listening environment 116 to determine the coordinate estimates for each of the loudspeakers 102 in the listening environment 116. In another example, each loudspeaker 102 may also transmit the distance estimation and the DOA information to the mobile device 114 to determine the coordinates for each loudspeaker 102 in the listening environment 116. It is recognized that the time difference of arrival (TDOA) corresponds to the input arrival time difference between the microphones 104*a*-104*b*. On the other hand, DOA corresponds to an angle of the sound source that may be calculated utilizing TDOA.

Figure 11:
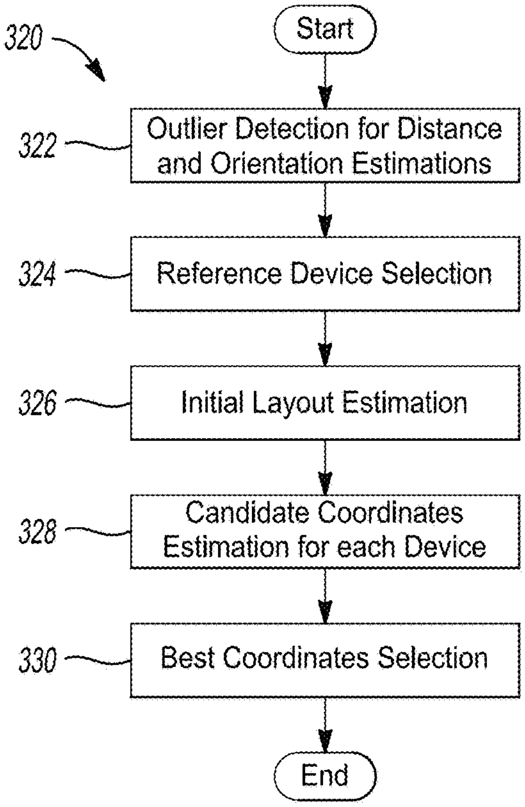
FIG. 11 generally depicts a method for performing optimization in accordance with one embodiment.

FIG. 11 generally depicts a method 320 for performing optimization in accordance with one embodiment. It is recognized that any one or more of the loudspeakers 102, 102*b* and the mobile device 114 may execute the method 320. The various operations of the method 320 will be discussed in more detail below. In general, the method 320 optimizes the final layout and distance estimations between the loudspeakers 102.

In operation 322, the optimization block 112 performs outlier detection for distance and orientation estimations. In general, due to background noise, reflections, and/or obstruction between the loudspeakers 102*a*, 102*b*; this aspect may cause an outlier for ToA estimations which may result in incorrect distance or DOA estimation with respect to the positioning of the loudspeakers 102*a*, 102*b* in the listening environment 116.

In operation 324, the optimization block 112 performs reference device selection for a reference loudspeaker 102 and places the reference loudspeaker 102 at an origin (0,0) for estimating the initial layout.

In operation 326, the optimization block 112 performs an initial layout estimation.

In operation 328, the optimization block 112 determines the candidate positions for the other loudspeakers 102 in the system 100.

In operation 330, the optimization block 112 chooses the candidate points for each loudspeaker 102 that have a minimum error.

Figure 12:
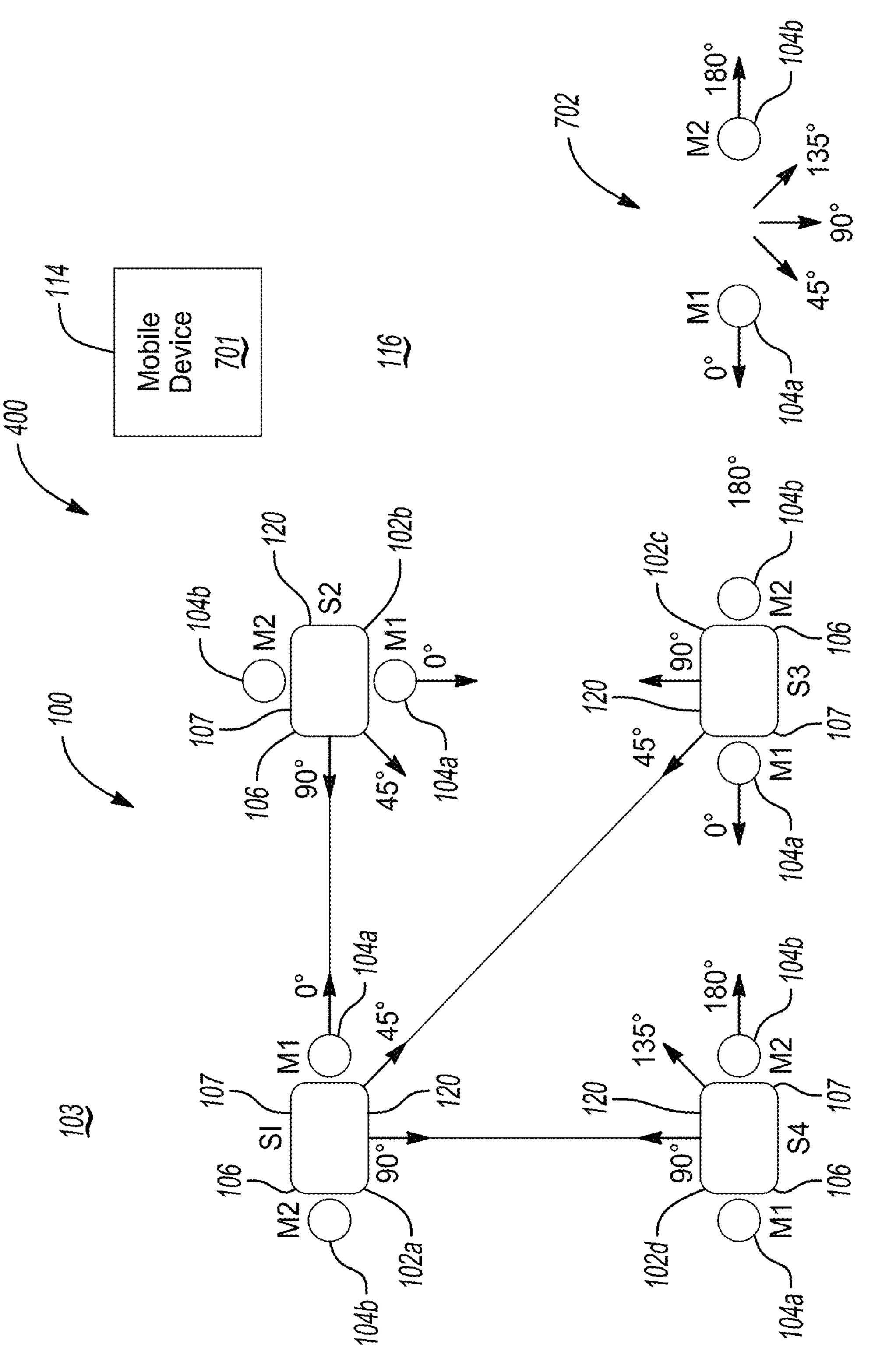
FIG. 12 depicts one example of a loudspeaker and microphone configuration in the system in accordance with one embodiment.

FIG. 12 depicts one example of a loudspeaker and microphone configuration 400 in the system 100 in accordance with one embodiment. The configuration 400 includes the loudspeakers 102 of FIG. 1. The loudspeakers 102 of FIG. 1 are generally shown as a first loudspeaker 102*a*, a second loudspeaker 102*b*, a third loudspeaker 102*c*, and a fourth loudspeaker 102*d* with reference to FIG. 12 and hereafter. As noted in connection with FIG. 1, any number of loudspeakers may be provided. Each of the first, second, third, and fourth loudspeakers 102*a*, 102*b*, 102*c*, and 102*d* include the first and the second microphones 104*a* and 104*b*. Similarly, each of the first, second, third, and fourth loudspeakers 102*a*, 102*b*, 102*c*, and 102*d* include the controller 106, the memory 107, and the transceiver 120. Similarly, each of the first, second, third, and fourth loudspeakers 102*a*, 102*b*, 102*c*, and 120*d* include the distance estimation block 108, the direction of arrival (DOA) estimation block 110, and the optimization block 112.

The mobile device 114 includes at least one processor 701 to execute the operations of the method 320. The mobile device 114 may wirelessly receive the coordinate estimates from one or more of the loudspeakers 102*a*-102*d*. It is also recognized that in another embodiment, the system 100 may include a primary loudspeaker 103. The primary loudspeaker 103 may correspond any of the loudspeakers 102*a*-102*d* and may simply designated as the primary loudspeaker to perform a similar task as the mobile device 114. For example, the primary loudspeaker 103 may be arranged to provide the layout of the loudspeakers 102 including the layout for the primary loudspeaker 103 based on the principles disclosed herein in response to receiving the distance information and DOA information from other loudspeakers in the system 100. In this sense, the primary loudspeaker 103 provides a similar level of functionality as that as provided in connection with the mobile device 114 in the event it may be preferred for the primary loudspeaker 103 to provide the location of the various loudspeakers 102 and 103 within the listening environment 116 for the purpose of establishing channel assignment for the loudspeakers 102 and 103. While the primary loudspeaker 103 may provide the location of the loudspeakers 102, 103 in the listening environment 116 in a similar manner to that explained with the mobile device 114, the primary loudspeaker 103 may not provide any visual indicators or prompts to the user with respect to the location of the loudspeaker 102, 103.

The first, second, third, and fourth loudspeakers 102*a*, 102*b*, 102*c*, and 102*d* wirelessly communicate with one another via the transceivers 120 and/or with the mobile device 114 to provide the loudspeaker layout in a listening environment 116. In particular, the mobile device 114 may provide a layout of the various loudspeakers 102*a*, 102*b*, 102*c*, and 102*d* as arranged in the listening environment 116. Generally, the particular layout of the loudspeaker 102*a*-102*d* may not be known relative to one another and aspects set forth herein may determine the particular layout of the loudspeakers 102*a*-102*d* in the listening environment 116. Once the layout of the loudspeakers 102*a*-102*d* is known, the mobile device 114 may assign channels to the loudspeakers 102*a*-102*d* in a deterministic way based on the prestored or predetermined system configurations.

The mobile device 114 may display the layout of the first, second, third, and fourth loudspeakers 102*a*, 102*b*, 102*c*, and 102*d* based on information received from such devices. In one example, the first, second, third, and fourth loudspeakers 102*a*, 102*b*, 102*c*, and 102*d* may wirelessly transmit DOA estimations, distance estimations, and coordinate estimations to one another via the transceivers 120 and/or with the mobile device 114.

A legend 702 is provided that illustrates various angles of positions of the microphones 104*a*-104*b* on one loudspeaker 102 relative to microphones 104*a*-104*b* on other the loudspeakers 102*a*, 102*b*, 102*c*, and 102*d*. Reference will be made to the legend 702 in describing the various operations of the method 300 below. The first, third, and fourth loudspeakers 102*a*, 102*c*, and 102*d* illustrate that their respective microphones 104*a*-104*b* are arranged horizontally on such loudspeakers 102*a*, 102*c*, and 102*d*. The second loudspeaker 102*b* illustrates that the microphones 104*a*-104*b* are arranged vertically on the second loudspeaker 102*b*. It is recognized that prior to the loudspeaker layout being determined, the arrangement of the microphones 104*a*-104*b* is not known and that the arrangement of the microphones 104*a*-104*b* may be arranged in any number of configurations on the loudspeakers 102*a*-102*d* in the listening environment 116. The disclosed system 100 and method 320 are configured to determine the loudspeaker configuration layout while taking into account the different configurations of microphones 104*a*-104*b*.

Referring to the first loudspeaker 102*a* and further in reference to the legend 702, the first loudspeaker 102*a* is capturing audio (or detecting audio) from the second loudspeaker 102*b* at 0 degrees. The first loudspeaker 102*a* is capturing audio (or detecting audio) from the third loudspeaker 102*c* at 45 degrees. The first loudspeaker 102*a* is capturing audio from the fourth loudspeaker 102*d* at an angle 90 degrees. The angle (or angle information) at which the remaining loudspeakers 102*b*-102*d* are receiving audio relative to the other loudspeakers 102*a*-102*d* are illustrated in FIG. 7. Any reference to the term "angle" may also correspond to "angle information" or vice versa. The relevance of the angles (or angle information) will be discussed in more detail below. It is recognized that each of the loudspeakers 102*a*-102*d* transmit information related to the angle information at which they receive the audio from one another to the mobile device 114 or other suitable computing device. The mobile device 114 stores the angles in memory thereof. The DOA information, the distance information, and/or the coordinate estimations as reported out by the loudspeakers 102*a*-102*d* are reported out as the angles as referenced above.

Figure 13:
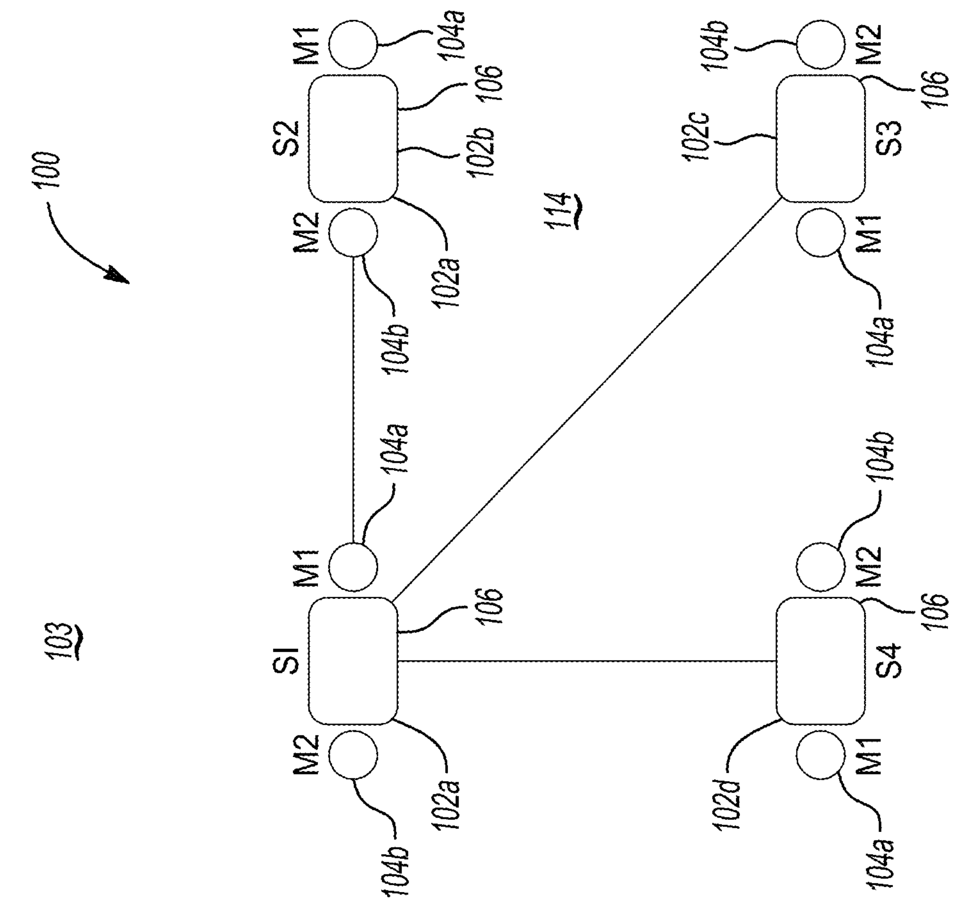
FIG. 13 depicts an example of the outlier detection and orientation estimation as performed by the method of FIG. 11.

FIG. 13 depicts an example of the outlier detection and orientation estimation as performed in operation 322 of the method 320. The optimization block 112 performs outlier detection for distance and orientation estimations. In general, due to background noise, reflections, and/or obstruction between the loudspeakers 102*a*-102*d*; this aspect may cause an outlier for ToA estimations which may result in incorrect distance or DOA estimation with respect to the positioning of the loudspeakers 102*a*-102*d* in the listening environment 116.

A first matrix 500 is illustrated which corresponds to distance estimation values with respect to the first loudspeaker 102*a*, the second loudspeaker 102*b*, the third loudspeaker 102*c*, and the fourth loudspeaker 102*d* in the listening environment 116. In general, each of the first loudspeaker 102*a*, the second loudspeaker 102*b*, the third loudspeaker 102*c* and the third loudspeaker 102*d* may transmit their distance estimations to the mobile device 114 such that the mobile device 114 performs operation 322. It is recognized as well that each of a designated loudspeaker from the first, second, third, or fourth loudspeakers 102*a*-102*d* may also perform any one or more operation of the method 320. As noted above, each of the loudspeakers 102*a*-102*d* include the controller 106 which comprises the distance estimation block 108, the DOA estimation block 110, and the optimization block 112. It is recognized that the mobile device 114 may include the optimization block 112 as well and receive information corresponding to the distance estimations relative to the loudspeakers 102*a*-102*d* in the system 100 in addition to the DOA information from the various loudspeakers 102*a*-102*d*.

The mobile device 114 may assembly the first matrix 500 based on the distance estimations values provided by each of the first, second, third, and fourth loudspeakers 102*a*-102*d*. In reference to the first matrix 500, S1 corresponds to the first loudspeaker 102*a*, S2 corresponds to the second loudspeaker 102*b*, S3 corresponds to the third loudspeaker 102*c*, and S4 corresponds to the fourth loudspeaker 102*d*. These designations generally apply to any matrix as set forth herein unless otherwise stated differently. A value of "−360" or "360" may be defined as a null value. In reference to the first column of the first matrix 500, it can be seen that the mobile device 114 populates the distance with "−360" of a null value since the distance between the first loudspeaker (S1) in the first column and the first loudspeaker 102*a* (S1) in the first row is zero since these are the same loudspeakers and the distance is zero. The distance between the first loudspeaker 102*a* (S1) and the second loudspeaker (S2) is 200 cm, the distance between the first loudspeaker 102*a* (S1) and the third loudspeaker 102*c* (S3) is 283 cm, and the distance between the first loudspeaker 102*a* (S1) and the fourth loudspeaker 102*d* (S4) is 200 cm. The layout as shown to the left of the first matrix 500 illustrates that the distance from the first loudspeaker 102*a* to the second loudspeaker 102*b* and the distance from the first loudspeaker 102*a* to the fourth loudspeaker 102*d* are similar to one another.

In general, there may be four distance estimations between the first loudspeaker 102*a* and the second loudspeaker 102*b* since loudspeaker 102 includes two microphones 104*a* and 104*b*. The four distance estimations may correspond to 195, 198, 200, 207 cm. The variance and mean of these distance estimations is 26 cm, 200 cm, respectively. Thus, the method 320 detects an outlier if the any estimations (195, 198, 200, 207) is not in the range of (200−26, 200+26)=(174, 226). For our example, all estimations are in the range above for the first loudspeaker 102*a* and the second loudspeaker 102*b*. Therefore, the mobile device 114 determines that there is no outlier for the distance estimation between first loudspeaker 102*a* and the second loudspeaker 102*b*. The mobile device 114 performs this operation for each pair of loudspeakers 102 in the system 100 to determine if there are any outliers.

A second matrix 502 is illustrated which corresponds to DOA estimation values with respect to the first loudspeaker 102*a*, the second loudspeaker 102*b*, the third loudspeaker 102*c*, and the fourth loudspeaker 102*d* in the listening environment 116. As noted above, a value of "−360" or "360" corresponds to a null value or zero. The first loudspeaker 102*a* estimates the DOA for the signal received from the second loudspeaker 102*b* at 0°, the second loudspeaker 102*b* estimates the DOA for the signal received from the first loudspeaker at 180°. The method 320 (or the mobile device 114) compares these DOA estimations to determine whether such estimations are equal or complimentary to 180°. With respect to the DOA estimations between the first loudspeaker 102*a* and the second loudspeaker 102*b*, the mobile device 114 determines that estimations are complimentary to 180°. Therefore, the mobile device 114 determines that there is no outlier for the DOA estimation between first loudspeaker 102*a* and the second loudspeaker 102*b*. It can be seen that the DOA estimation values between the first loudspeaker 102*a* and the third loudspeaker 102*c* are both equal to 45 degrees. Therefore, no outliers are detected between the first loudspeaker 102*a* and the third loudspeaker 102*c*. Similarly, it can be seen that the DOA estimations between the first loudspeaker 102*a* and the fourth loudspeaker 102*d* are both equal to 90 degrees. Therefore, no outliers are detected between the first loudspeaker 102*a* and the fourth loudspeaker 102*d*. This process is performed for all of the combinations of loudspeakers 102 illustrated in the second matrix 502.

FIG. 14 depicts an example of the reference speaker selection as performed in operation 324 of the method 320. In general, the mobile device 114 places each reference loudspeaker 102 at an origin (0,0) and places other loudspeaker 102*a* or 102*b*, based on its own estimations, for estimating the initial layout. The initial layout is estimated based on the estimations of reference speaker 102. For example, if loudspeaker 102*a* (or S1) is the reference speaker, the first rows of Dist_Est and DOA_Est matrixes are used for the initial layout estimation. The method 320 checks the outliers and selects the loudspeaker 102 which doesn't have any outlier. If there is no such a loudspeaker 102, the method raises an error and asks for repetition of the calibration. An error may be set if there is no outlier. For example, there operation 322 is not repeated if a reference loudspeaker is assigned. Operation 322 may need to be repeated if the reference loudspeaker is not assigned successfully, which entails that all of the loudspeakers 102 are an outlier. The error may be attributed to noise, reverberations, and/or obstructions. The diagonals of DIST_OUTLIER and DOA_OUTLIER correspond to estimations of the loudspeaker 102 itself. Since an estimate of the distance/DOA of the loudspeaker 102 by itself is not performed, the disclosed system and/or method may insert an angle-360 to the diagonals of DIST_OUTLIER and DOA_OUTLIER.

FIGS. 15 and 16 depict an example of initial layout estimation as performed in operation 326 of the method 320. FIG. 15 illustrates the first matrix 500 and the second matrix 502 as first shown in FIG. 13 for reference. The mobile device 114 may utilize the values shown in the first matrix 500 and the second matrix 502 in connection with the below equation.

$$\text{Initial location}_i = (dist_{1i} * \cos(DOA_{1i}),\ dist_{1i} * \sin(DOA_{1i})) \qquad (20)$$

where i represents the speaker number higher than 1, $dist_{1i}$ denotes a distance estimation between a $1^{st}$ and an $i^{th}$ speaker, and $DOA_{1i}$ is the DOA estimation of $i^{th}$ device (or loudspeaker 102*a*-102*d*) at the loudspeaker 102*a*-102*d*.

The mobile device 114 may execute equation 20 for the distance estimation and the DOA estimation value for the second loudspeaker 102*b*, the third loudspeaker 102*c*, and the fourth loudspeaker 102*d* relative to the first loudspeaker 102 which generally serves as the primary loudspeaker 103. For example, the following may be calculated:

$$(x_2^1, y_2^1) = (200 * \cos(0), -200 * \sin(0)) = (200, 0)$$

$$(x_3^1, y_3^1) = (283 * \cos(45), -283 * \sin(45)) = (200, -200)$$

$$(x_4^1, y_4^1) = (200 * \cos(90), -200 * \sin(90)) = (0, -200)$$

This may also be completed for each loudspeaker 102 in the system 100 as will be discussed in more detail in connection with operation 328. For example, the second loudspeaker 102*b*, the third loudspeaker 102*c*, and the fourth loudspeaker 102*d* may be designated as the primary loudspeaker 103 and similar calculations may be performed relative to the other reference loudspeakers 102. It can be shown that the coordinate as provided above (200,0) (e.g., for the second loudspeaker 102*b*), (200, −200) (e.g., for the third loudspeaker 102*c*), and (0, −200) (e.g., for the fourth loudspeaker 102*d*) in reference to the first loudspeaker 102*a* (e.g., the primary loudspeaker) generally coincides with the coordinates or positions of the second loudspeaker 102*b*, the third loudspeaker 102*c*, and the fourth loudspeaker 102*d* relative to the first loudspeaker 102*a* as shown in in the listening environment 116 as illustrated in FIGS. 12-13.

FIG. 17 depicts an example of candidate coordinate estimations as performed in operation 328 of the method 320. The mobile device 114 determines candidate positions for the other (or remaining) loudspeakers 102*b*-102*d* in the system 100. As discussed in operation 326, the initial layout using estimations from the first loudspeaker 102*a* (or the primary loudspeaker) is determined. The rest of the estimations from the remaining loudspeakers (e.g., the second loudspeaker 102*b*, the third loudspeaker 102*c*, and the fourth loudspeaker 102*d*) can be utilized to ensure that the result is more robust.

The mobile device 114 may execute equation 20 for the distance estimation and the DOA estimation values for the first loudspeaker 102*a*, the third loudspeaker 102*c*, and the fourth loudspeaker 102*d* relative to the second loudspeaker 102*b* which generally serves as the primary loudspeaker 103. For example, the following may be calculated:

$$(x_1^2, y_1^2) = \text{No estimation for primary device and } (x_{s2}, y_{s2}) = (200, 0)$$

$$(x_3^2, y_3^2) = (200 + 195 * \cos(90), 0 - 195 * \sin(90) = (200, -195)$$

$$(x_4^2, y_4^2) = (275 * \cos(135), -275 * \sin(135)) = (5.54, -194.45)$$

The mobile device 114 may execute equation 20 for the distance estimation and the DOA estimation values for the first loudspeaker 102*a*, the second loudspeaker 102*b*, and the fourth loudspeaker 102*d* relative to the third loudspeaker 102*c* which generally serves as the primary loudspeaker 103. Similarly, the mobile device 114 may execute equation 20 for the distance estimation and the DOA estimation values for the first loudspeaker 102*a*, the second loudspeaker 102*b*, and the third loudspeaker 102*c* relative to the fourth loudspeaker 102*d* which generally serves as the primary loudspeaker 103.

FIG. 18 depicts an example of the best coordinate selection as performed in operation 330 of the method 320. FIG. 18 depicts the first matrix 500 and the second matrix 502 for reference. The mobile device 114 selects candidate points that minimize an error. For example, the mobile device 114 may calculate or determine the error based on the following:

$$\text{Error}_{iC} = \sum_j^N \left|dist_{ij} - \hat{dist}_{ij}\right| + \left|DOA_{ij} - \hat{D}\text{OA\_ij}\right|,\ i \neq j \qquad (21)$$

where i and j represent the speaker number, C is the index for the candidates, $\hat{d}$ denotes the estimation of d.

As noted in connection with operation 328, the candidate points for the third loudspeaker 102*c* from the second loudspeaker 102*b* is as follows:

$$(x_3^2, y_3^2) = (200, -195)$$

Thus, using equation 21 as provided above, the mobile device 114 may determine the error as follows:

$$\text{Error}_{3C} = |279.32 - 283| + |200 - 195| + |200 - 200.06| + |45 - 44.27| + |90 - 90| + |180 - 178.57| = 10.90$$

The error is calculated to locate or determine the best candidate points for the dedicated loudspeaker location. For example, $\text{Error}_{3C}$ is the error of point "C" for the loudspeaker 102*c*. The candidate points with the lowest error is selected as a final estimation of the dedicated loudspeaker 102.

In general, while the mobile device 114 is identified as performing operations 322, 324, 326, 328, and 330 of FIG. 11, it is recognized that the primary loudspeaker 103 may perform such operations in lieu of the mobile device 114. It is recognized that in the event the mobile device 114 performs the method 320, the mobile device 114 utilizes its optimization block 112 to execute the operations of the method 320 to determine the location of the loudspeakers 102 in the listening environment 116. In this regard, each loudspeaker 102 in the system 100 may transmit the distance information from their respective distance estimation block 108 and for their respective DOA estimation block 110 to the mobile device 114 such that the mobile device 114 utilizes its optimization block 112 to determine the location of the loudspeakers in the system 100 based on the distance information and the DOA information provided by each loudspeaker 102 in the system 100. Conversely, in the event the primary loudspeaker 103 performs the method 320, the primary loudspeaker 103 utilizes its optimization block 112 to execute the operations of the method 320 to determine the location of the loudspeakers 102 in the listening environment 116. In this regard, each loudspeaker 102 in the system 100 may transmit the distance information from their respective distance estimation block 108 and from their respective DOA estimation block 110 to the primary loudspeaker 103 such that the primary loudspeaker 103 utilizes its optimization block 112 to determine the location of the loudspeakers in the system 100 based on the distance information and the DOA information provided by each loudspeaker 102 in the system 100.

Figure 19:
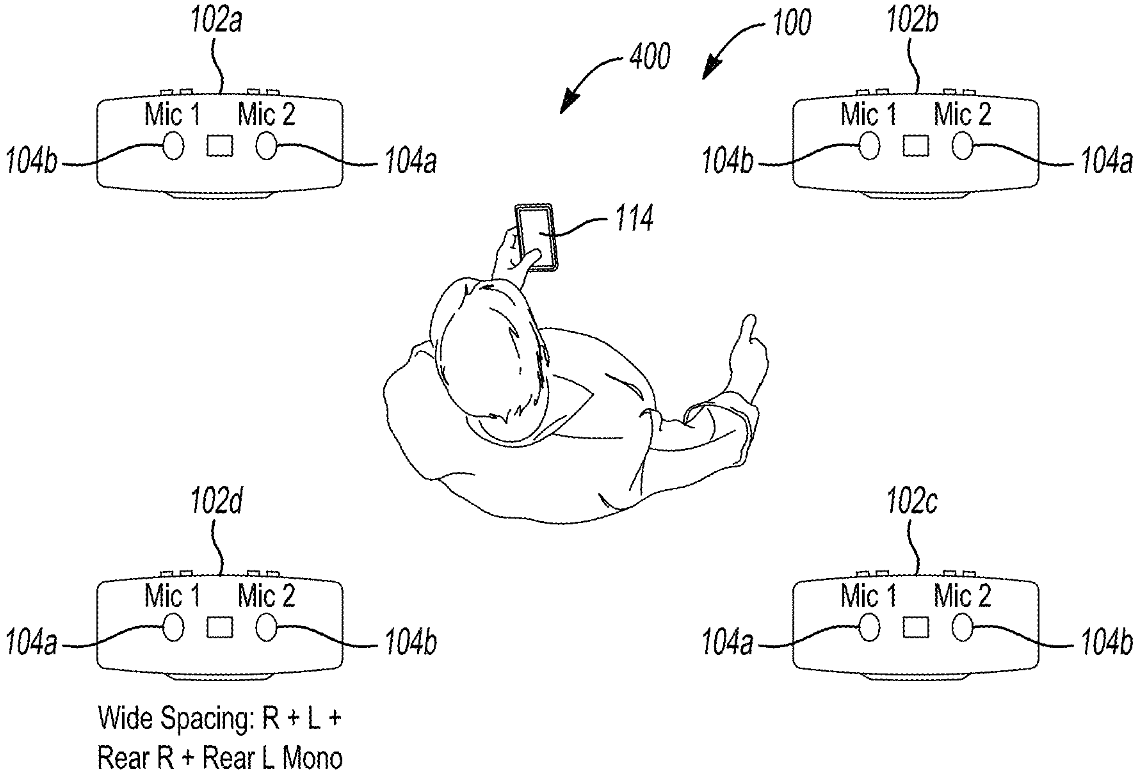
FIG. 19 depicts one example of a loudspeaker and microphone configuration in the system.

FIG. 19 depicts one example of a loudspeaker and microphone configuration 400 in the system 100. For example, the disclosed system 100 and method 320 determines the coordinates for the loudspeakers 102*a*-102*d* in the listening environment 116. The mobile device 114 utilizes the coordinates (or locations) of the loudspeakers 102*a*-102*d* for channel assignment for, but not limited to, immersive sound generation.

It recognized that the controllers as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, such controllers as disclosed utilizes one or more microprocessors to execute a computer-program that is embodied in a non-transitory computer readable medium that is programmed to perform any number of the functions as disclosed. Further, the controller(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware-based inputs and outputs for receiving and transmitting data, respectively from and to other hardware-based devices as discussed herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An audio system comprising:

a first loudspeaker to transmit a first audio signal including a first signature tone into a listening environment;

a second loudspeaker including:

at least one controller being programmed to:

transmit a second audio signal including a second signature tone into the listening environment;

receive the first audio signal including and the first signature tone;

receive the second audio signal including the second signature tone after transmitting the second signature tone into the listening environment;

determine an estimated distance between the first loudspeaker and the second loudspeaker based at least on the first signature tone and the second signature tone; and perform a time frequency masking operation to extract at least one of the first signature tone from the first audio signal and the second signature tone from the second audio signal prior to determining the estimated distance between the first loudspeaker and the second loudspeaker.

2. The audio system of claim 1, wherein the second loudspeaker includes a first microphone to receive the first audio signal to provide a first received audio signal and a second microphone to receive the first audio signal to provide a second received audio signal.

3. The audio system of claim 2, wherein the at least one controller is further programmed to perform a Short Time Fourier Transform (STFT) operation on the first received audio signal and the second received audio signal to apply a predetermined overlap thereto prior to performing the time frequency masking operation.

4. The audio system of claim 3, wherein the at least one controller is further programed to perform the STFT operation to convert the first received audio signal and the second received audio signal from a time domain into a frequency domain.

5. The audio system of claim 2, wherein the at least one controller is further programmed to perform a first cross correlation operation to determine one or more delays associated with the first received audio signal and the second received audio signal.

6. The audio system of claim 5, wherein the at least one controller is further programmed to perform a second cross correlation operation to mitigate reverberations on the first received audio signal and the second received audio signal after performing the first cross correlation operation.

7. The audio system of claim 2, wherein the at least one controller is further programmed to determine the estimated distance between the first loudspeaker and the second loudspeaker based at least on a time of arrival of the first signature tone on the first received audio signal and a time of arrival of the first signature tone on the second received audio signal.

8. The audio system of claim 7, wherein the time frequency masking operation is based on one of an ideal binary mask (IBM), an ideal ratio mask (IRM), a complex ideal ratio mask (cIRM), and an optimal ratio mask (ORM).

9. The audio system of claim 1, wherein the second loudspeaker is further programmed to transmit the estimated distance between the first loudspeaker and the second loudspeaker to a mobile device.

10. An audio system comprising:

a first loudspeaker including:

memory; and at least one controller being operably coupled to the memory and being programmed to:

transmit a first audio signal including a first signature tone into a listening environment;

receive a second audio signal including a second signature tone from a second loudspeaker;

receive the first audio signal including the first signature tone after transmitting the first audio signal into the listening environment;

determine an estimated distance between the first loudspeaker and the second loudspeaker based at least on the first signature tone and the second signature tone; and perform a time frequency masking operation to extract at least one of the first signature tone from the first audio signal and the second signature tone from the second audio signal prior to determining the estimated distance between the first loudspeaker and the second loudspeaker.

11. The audio system of claim 10, wherein the first loudspeaker includes a first microphone to receive the first audio signal to provide a first received audio signal and a second microphone to receive the first audio signal to provide a second received audio signal.

12. The audio system of claim 11, wherein the at least one controller is further programmed to perform a Short Time Fourier Transform (STFT) operation on the first received audio signal and the second received audio signal to apply a predetermined overlap thereto prior to performing the time frequency masking operation.

13. The audio system of claim 12, wherein the at least one controller is further programed to perform the STFT operation to convert the first received audio signal and the second received audio signal from a time domain into a frequency domain.

14. The audio system of claim 11, wherein the at least one controller is further programmed to perform a first cross correlation operation to determine one or more delays associated with the first received audio signal and the second received audio signal.

15. The audio system of claim 14, wherein the at least one controller is further programmed to perform a second cross correlation operation to mitigate reverberations on the first received audio signal and the second received audio signal after performing the first cross correlation operation.

16. The audio system of claim 11, wherein the at least one controller is further programmed to determine the estimated distance between the first loudspeaker and the second loudspeaker based at least on a time of arrival of the first signature tone on the first received audio signal and a time of arrival of the first signature tone on the second received audio signal.

17. The audio system of claim 10, wherein the time frequency masking operation is one of an ideal binary mask (IBM), an ideal ratio mask (IRM), a complex ideal ratio mask (cIRM), and an optimal ratio mask (ORM).

18. A computer-program product embodied in a non-transitory computer readable medium that is stored in memory and that is programmed and executable by at least one controller in an audio system, the computer-program product comprising instructions to:

transmit a second audio signal including a second signature tone into a listening environment via a second loudspeaker;

receive a first audio signal including a first signature tone from a first loudspeaker;

receive the second audio signal including the second signature tone after transmitting the second audio signal;

determine an estimated distance between the first loudspeaker and the second loudspeaker based at least on the first signature tone and the second signature tone; and perform a time frequency masking operation to extract at least one of the first signature tone from the first audio signal and the second signature tone from the second audio signal prior to determining the estimated distance between the first loudspeaker and the second loudspeaker.

19. The computer-program product of claim 18 further comprising instructions to perform a first cross correlation operation to determine one or more delays associated with at least the received audio signal.

20. The computer-program product of claim 19 further comprising instructions to perform a second cross correlation operation to mitigate reverberations on the at least the received audio signal after performing the first cross correlation operation.

* * * * *